(12) United States Patent
Nishizawa

(10) Patent No.: US 8,804,193 B2
(45) Date of Patent: Aug. 12, 2014

(54) COLOR CONVERSION DEVICE, IMAGE-FORMING DEVICE, STORING MEDIUM STORING COLOR CONVERSION PROGRAM AND IMAGE-FORMING PROGRAM AND COLOR CONVERSION TABLE

(71) Applicant: Kyocera Document Solutions Inc., Osaka-shi (JP)

(72) Inventor: Akira Nishizawa, Osaka (JP)

(73) Assignee: Kyocera Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 13/625,437

(22) Filed: Sep. 24, 2012

(65) Prior Publication Data

US 2013/0077107 A1    Mar. 28, 2013

(30) Foreign Application Priority Data

Sep. 28, 2011   (JP) .................................. 2011-212417

(51) Int. Cl.
*G06F 15/00*   (2006.01)
(52) U.S. Cl.
USPC ............. 358/1.9; 358/520; 358/518; 382/167

(58) Field of Classification Search
USPC .................... 358/1.9, 2.1, 518, 520; 382/167
See application file for complete search history.

(56) References Cited

U.S. PATENT DOCUMENTS

| 5,881,211 A | 3/1999 | Matsumura |
| 2008/0285844 A1* | 11/2008 | Romney ........................ 382/162 |

FOREIGN PATENT DOCUMENTS

| JP | H09-224158 | 8/1997 |
| JP | 2009-017097 | 1/2009 |
| JP | 2009-017098 | 1/2009 |

* cited by examiner

*Primary Examiner* — Jamares Q Washington
(74) *Attorney, Agent, or Firm* — Manabu Kanesaka

(57) ABSTRACT

A color conversion program including a grid point arranging part which arranges, between an input device represented by three values of RGB and four values of CMYK, grid points as correspondence of the RGB value of the input device and the CMYK value of the output device in a radial direction from a prescribed achromatic color axis to generate a radial color conversion table; and a color conversion table restructuring processing part which stacks, in the order of hue, a hue layer consisting of a surface of a hue and a surface of its complementary hue of the radial color conversion table to generate an orthogonal grid color conversion table in which the grids form an orthogonal grid.

7 Claims, 21 Drawing Sheets

COLOR CONVERSION DEVICE, IMAGE-FORMING DEVICE, STORING MEDIUM STORING COLOR CONVERSION PROGRAM AND IMAGE-FORMING PROGRAM AND COLOR CONVERSION TABLE

RELATED APPLICATIONS

The present application is based on, and claims priority from, Japanese Application No. JP2011-212417 filed Sep. 28, 2011, the disclosure of which is hereby incorporated by reference herein in its entirety.

TECHNICAL FIELD

The present invention relates to a color conversion device which converts the input image data of RGB format into image data of CMYK format, an image-forming device which is provided with a color conversion device and outputs the image data of CMYK format which has been converted by the color conversion device, a color conversion program for performing the function of the color conversion device, an image-forming program for performing the function of the image-forming device, and a color conversion table used for the color conversion.

BACKGROUND ART

In an image-forming device such as a color printer, when printing is conducted, color image data of RGB format which has been input is converted into image data of CMYK format which can be output by means of a lookup table for color conversion (color conversion table).

A color conversion table is formed of correspondence of an RGB value and a CMYK value, and hence can be expressed by an orthogonal grid using each correspondence as a grid point.

FIG. 28 is a schematic view of a RGB-CMYK color conversion table represented by orthogonal grids of the orthogonal coordinate system using as grid point correspondence of Rd (red), Gr (green), Bl (blue) with Cy (cyan), Mg (magenta) and Ye (yellow) as basic colors and Wh (white) and Bk (black) as achromatic color.

On each grid point of the orthogonal grids shown in FIG. 28, an RGB value and a CMY value corresponding thereto have been assigned in advance. Therefore, a CMYK value of an output device corresponding to an arbitral RBG value relating to an input device can be smoothly derived (JP-A-H09-224158).

However, it is known that the sense which can be understood by a man's brain is more sensitive to the components of three directions, i.e. the direction along the achromatic color axis which connects Wh and Bk, the radial direction centering around the achromatic color axis (chroma) and the coaxial direction (hue), rather than the axial direction of each of RGB. That is, in many cases, the feeling by which a man distinguishes the difference in color is not based only on the spatial distance, but rather is dependent on the coordinate position in a color space.

Specifically, as compared with variations in the direction along each axis of R, G and B, accuracy in the radial direction centering around the achromatic color axis or variations in distance in the coaxial direction of the achromatic color axis is a more important factor to grasp the color shade.

Therefore, in a conventional color conversion table formed of orthogonal grids in which an RGB value is simply in correspondence with a CMYK value, a human sense to colors is not reflected, and hence, the conventional color conversion table was poor in color reproducibility.

FIG. 29 is a view for explaining the problem associated with conventional color conversion tables, and is a view showing a grid point arrangement when FIG. 28 is viewed from the achromatic axis direction.

As shown in FIG. 29, in the radial direction (direction of color chroma) centering around the achromatic color axis, grid points present on the same hue are arranged at an irregular interval.

For example, between the achromatic color axis and each line of Rd, Gr, Bl, Cy, Mg and Ye, 5 grid points are arranged. However, on a line which is middle between the achromatic color axis and the Cy-Bl line, only 3 grid points are arranged.

Further, as viewed in respect of a coaxial circle, it can be understood that the interval of grid points present on the same chroma is irregular depending on the distance from the achromatic color axis (central axis). That is, it can be acknowledged that the variation in a reproducible hue varies depending on the difference in chroma.

Therefore, according to such conventional color conversion table, it was difficult to conduct color adjustment such as optimization of chroma according to hue or optimization of hue according to chroma.

Under such circumstances, in order to solve the problems associated with conventional color conversion table, a radial grid color conversion table has been proposed, in which an appropriate color conversion process is enabled by adding necessary grid points to a conventional color conversion table (JP-A-2009-17097 and JP-A-2009-17098).

FIG. 30 is a grid point arrangement view when a radial color conversion table disclosed in JP-A-2009-17097 or JP-A-2009-17098 is viewed from the achromatic color axis direction.

As shown in FIG. 30, according to this radial color conversion table, grid points are arranged at an equal interval according to a certain hue width, and at the same time, grid points are arranged at an equal interval according to a certain chroma width. Accordingly, an adequate color adjustment which conforms to shade or tone sensed by a human being is possible.

SUMMARY OF THE INVENTION

However, in the above-mentioned radial color conversion table, since each grid point is radially arranged with the achromatic color axis being its center, there are problems that the coordinate position does not fundamentally coincident with the grid points of the orthogonal grids, for example. That is, integrity with a system using a conventional color conversion table was not taken into consideration.

Therefore, arithmetic operation methods, programs, algorism or the like relating to color conversion, color adjustment or the like which were used in conventional orthogonal grid color conversion tables cannot be used. As a result, combined use, mixing and fusion with an existing device or system which uses such color conversion table was difficult.

That is, various merits (cost reduction, for example) given by the use of a conventional color conversion table of which the formulation into ASIC has become easy as a result of acquisition of related technical knowledge by many technical experts and sophistication of algorism through improvement over many years cannot be obtained.

In particular, a cubic grid color conversion table having the same number of grids on one side has been widely used. Therefore, integrity, compatibility and affinity with such cubic grid color conversion table or conventional devices using such color conversion table have been required to be improved.

The present invention has been made in order to solve the above-mentioned problems associated with conventional technologies. An object of the present invention is to provide a cubic grid color conversion table which enables adequate color conversion or color adjustment which conforms to the sense of a human being and exhibits high integrity, compatibility and affinity with conventional color conversion tables or existing devices or systems provided with such color conversion table, a color conversion device which generates this cubic grid color conversion table and conducts color conversion, an image-forming device in which an output means for outputting image data is provided in such color conversion device, a color conversion program which generates the above-mentioned cubic grid color conversion table to conduct color conversion, and a storing medium which stores an image-forming program for outputting image data in addition to the function of this color conversion program.

In order to attain the above-mentioned object, the color conversion device of the invention comprises a grid arranging part which arranges, between an input device represented by three values of RGB and four values of CMYK, grids as correspondence of the RGB value of the input device and the CMYK value of the output device equally in a radial direction from a prescribed achromatic color axis to generate a radial color conversion table; a color conversion table restructuring processing part which stacks, in the order of hue, a hue layer consisting of a surface of a hue and a surface of a complementary hue of the radial color conversion table to generate an orthogonal grid color conversion table in which the grid points form orthogonal grids; an image information input part which inputs image data of RGB format; and a color conversion processing part which converts the input image data of RGB format into image data of CMYK format by means of the orthogonal grid color conversion table.

Here, in color conversion from the RGB value to the CMYK value, the above-mentioned grid point arrangement part divides the line RdYe, the line YeGr, the line GrCy, the line CyBl, the line BlMg, and the line MgRd of the orthogonal grid having Rd (red), Gr (green), Bl (blue), Cy (cyan), Mg (magenta), Ye (yellow), Wh (white) and Bk (black) as the vertex into N equal parts (N is an arbitral positive integer) to generate a predetermined color region chroma edge points, divides the color region chroma edge point into the combination of the chroma saturation point P and the chroma saturation point P' which satisfy the complementary color relationship, and generates the radial color conversion table by arranging the grid point at an intersection obtained by dividing the line BkP and the line BkP' of a square part formed of BkPWhP' which is formed for each combination into 3N equal parts.

The above-mentioned color conversion restructuring processing part has a configuration in which, in the order of hue, a hue layer consisting of the same color hue surface and its complementary color hue surface of the radial color conversion table is stacked to generate an orthogonal grid color conversion table in which the grid points form orthogonal grids.

Further, the image-forming device of the present invention has a configuration in which the above-mentioned color conversion device is provided, and is provided with an image information output part which outputs image data of CMYK format which has been color-converted by means of the color conversion device.

The color conversion program stored in the storing medium of the present invention allows a computer to function as a grid point arranging part which arranges, between an input device represented by three values of RGB and four values of CMYK, grid points as correspondence of the RGB value of the input device and the CMYK value of the output device equally in a radial direction from a prescribed achromatic color axis to generate a radial color conversion table; a color conversion table restructuring processing part which stacks, in the order of hue, a hue layer consisting of a surface of a hue and a surface of its complementary hue of the radial color conversion table to generate an orthogonal grid color conversion table in which the grids form orthogonal grids; and a color conversion processing part which converts the input image data of RGB format into image data of CMYK format by means of the orthogonal grid color conversion table; and in color conversion from the RGB value to the CMYK value, in the grid arranging part, in a RGB-CMYK space represented by the three-dimensional orthogonal coordinates, allows the grid arrangement part to divide the line RdYe, the line YeGr, the line GrCy, the line CyBl, the line BlMg, and the line MgRd of the orthogonal grid having Rd (red), Gr (green), Bl (blue), Cy (cyan), Mg (magenta), Ye (yellow), Wh (white) and Bk (black) as the vertex into N equal parts (N is an arbitral positive integer) to generate a predetermined color region chroma edge points, divide the color region chroma edge point into the combination of the chroma saturation point P and the chroma saturation point P' which satisfy the complementary color relationship, generate the radial color conversion table by arranging, the grid points at an intersection obtained by dividing the line BkP and the line BkP' of a square part formed of BkPWhP' which is formed for each combination into 3N equal parts, and allows the color conversion restructuring processing part to generate the orthogonal grid color conversion table in which the grid forms an orthogonal grid by stacking, in the order of hue, a hue layer consisting of a surface of a hue and a surface of its complementary hue of the radial color conversion table.

Further, the image-forming program stored in the storing medium of the present invention has the function of the color conversion program, and allows the color-converted image data of CMYK format to be output to a computer by the function of the color conversion program.

The color conversion table of the present invention is a color conversion table for converting the image data of RGB format which has been input into image data of CMYK format, in which, between an input device represented by three values of RGB and four values of CMYK, the grid points as correspondence of the RGB value of the input device and the CMYK value of the output device are arranged equally in a radial direction from a prescribed achromatic color axis to form a radial group of grid points, and, in the order of hue, a hue layer consisting of a surface of a hue and a surface of its complementary hue of the radial color conversion table are stacked to form orthogonal grids, the predetermined color region chroma edge point obtained by dividing the line RdYe, the line YeGr, the line GrCy, the line CyBl, the line BlMg, and the line MgRd of the orthogonal grid having Rd (red), Gr (green), Bl (blue), Cy (cyan), Mg (magenta), Ye (yellow), Wh (white) and Bk (black) into N equal parts (N is a positive integer) into the combination of the chroma saturation point P and the chroma saturation point P' which satisfy the complementary color relationship, a radial group of grids in which the grid points are arranged, at an intersection obtained by dividing the line BkP and the line BkP' of a square part formed of BkPWhP' which is formed for each combination into 3N equal parts, and a hue layer consisting of a surface of a hue and a surface of its complementary hue are stacked in the order of hue to allow the grids to form a cubic grid.

According to the color conversion device, the image-forming device, the color-conversion program, the image-forming program and the color-conversion table of the present invention, it is possible to conduct adequate color conversion or color adjustment which is suited to the sense of a human being, and a high degree of integrity, compatibility and affinity for the existing device or system can be attained.

BRIEF DESCRIPTION OF THE DRAWINGS

FIG. 7 is viewed from the direction of the achromatic color axis;

MODE FOR CARRYING OUT THE INVENTION (Color Conversion Device, Image-Forming Device)

Hereinbelow, the embodiment of the present invention will be explained with reference to the drawings.

Figure 1:
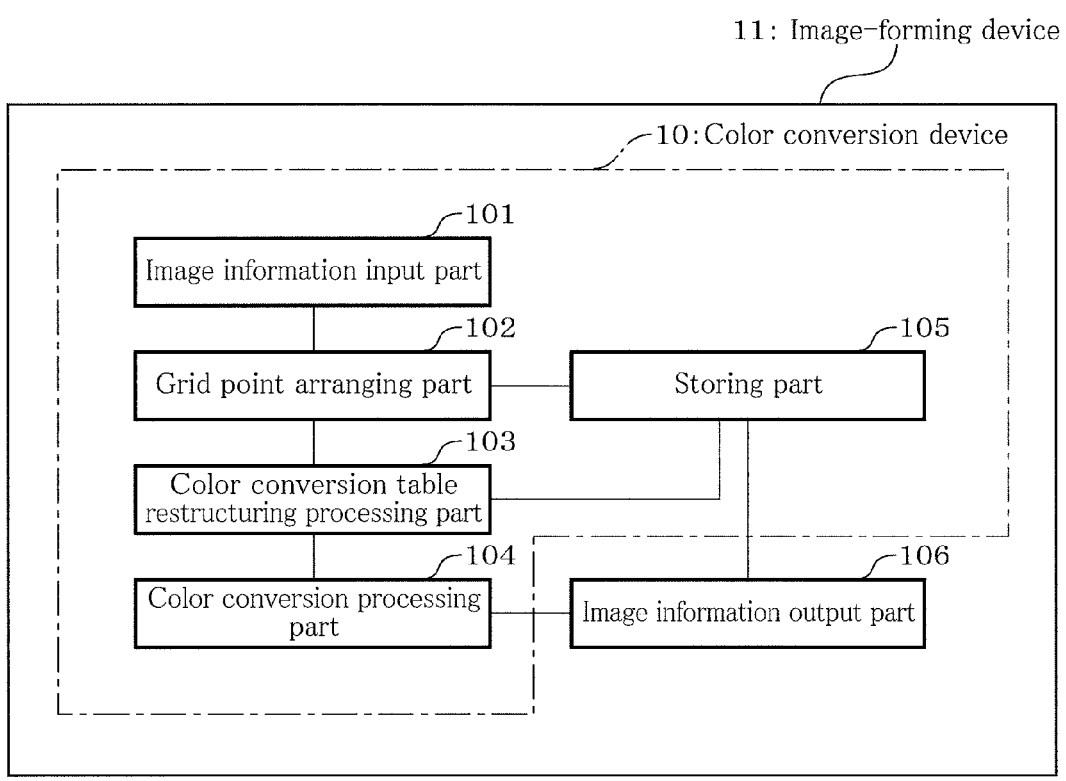
FIG. 1 is a block diagram showing the structure of the color conversion device and the image-forming device according to the embodiment of the present invention.

FIG. 1 is a block diagram showing the configuration of the color conversion device and the image-forming device according to the embodiment of the present invention.

As shown in FIG. 1, an image-forming device 11 of this embodiment is composed of an color-conversion device 10 formed of an image information input part 101, a grid point arranging part 102, a color conversion table restructuring processing part 103, a color conversion processing part 104 and a storing part 105, and an image information output part 106.

Each part will be explained below.

The image information input part 101 inputs image data such as full color image data. Specifically, it has a function of obtaining image data of RGB format by inputting from an external host computer (not shown) or reading by a scanner (not shown) or by taking out from a portable memory device such as an USB memory (not shown).

The grid point arranging part 102 arranges, between an input device represented by three values of RGB and four values of CMYK, grid points as correspondence of the RGB value of the input device and the CMYK value of the output device equally in a radial direction from a prescribed achromatic color axis, thereby to generate a radial color conversion table.

Specifically, in color conversion from the RGB value to the CMYK value, the line RdYe, the line YeGr, the line GrCy, the line CyBl, the line BlMg, and the line MgRd of the orthogonal grid having Rd (red), Gr (green), Bl (blue), Cy (cyan), Mg (magenta), Ye (yellow), Wh (white) and Bk (black) as the vertex are divided into N equal parts (N is an arbitral positive integer) to generate predetermined color region chroma edge points. This color region chroma edge points are then divided into the combination of the chroma saturation point P and the chroma saturation point P' which satisfy the complementary color relationship, and a radial color conversion table Ta is generated by arranging the grid point at an intersection obtained by dividing the line BkP and the line BkP' of a square part formed of BkPWhP' which is formed for each combination, into 3N equal parts. Meanwhile, as for the method for forming the radial color conversion table Ta, a detailed explanation will be made on the corresponding part (Step 1) of the "method for generating an orthogonal grid color conversion table", given later.

The color conversion table restructuring part 103 stacks, in the order of hue, a hue layer consisting of a surface of a hue and a surface of its complementary hue of the radial color conversion table to generate an orthogonal grid color conversion table Tb in which the grid points form orthogonal grids.

In particular, this embodiment is characterized by generation of a cubic grid type color conversion Tb in which each side has the same number of grid points.

That is, in the group of grid points generated by the grid point arranging part 102, the achromatic color axis is included as the common shaft. In the color conversion from the RGB value to the CMYK value, a group of grid points on a surface of a hue and a surface of its complementary hue is stratified as one group. Thereafter, for each group, a hue layer is formed by combining the group of grid points on the noted hue and the hue of its complementary color. These are temporarily decomposed and taken out, and then, the hue layer in each group is stacked hierarchically in the order of hue.

By doing this, arrangement of grid points which is radial relative to the achromatic color axis is re-structured such that it conforms to the arrangement of each grid point in a conventional cubic grid color conversion table.

When a hue layer formed of a combination of a noted hue and the hue of its complementary color is stacked hierarchically in the order of hue, that is, when a hue angle is stacked hierarchically clockwise or counterclockwise in the order of hue, since the hue angle is 360° in the whole circumference, all grind points can be covered by stacking each hue layer in an amount corresponding to the rotation of about 180°.

Further, a hue layer formed of a group of grid points of a matrix prepared by reversing the coordinate of grid points in the line direction in the initial hue layer (a hue layer formed of the initial noted hue and the hue of its complementary color) and grid points in the row direction is taken as the final hue layer. As a result, load of operation relating to the generation of the final hue layer can be reduced (see FIG. 16).

The color conversion processing part 104 converts image data of RGB format which has been input by the image information input part 101 into image data of CMYK format by using the orthogonal grid color conversion table Tb.

The storing part 105 is composed of a storing medium such as a memory and a hard disc, and stores the radial color conversion table Ta or the cubic grid color conversion table Tb, and temporarily stores image data of CMYK format generated by the color conversion treatment by the color conversion processing part 104.

The image information output part 106 is composed of the so-called printing engine or the like, and performs printing of image data of CMYK format stored in the storing part 105 of the color conversion device 10.

For example, if image data per page is stored in the storing part 105, an exposure treatment is conducted for a photoconductor drum (not shown) which has been charged in advance to form a latent image of this image data. Then, toner is attached to this latent image to form a toner image, and the toner image is then transferred and fixed to printing paper or the like, whereby a printing treatment is conducted.

Meanwhile, the image information output part 106 includes a transmission device or the like which outputs image data to external devices such as other image-forming devices.

(Method for Generating a Cubic Grid Color Conversion Table)

Next, a method for generating the cubic grid color conversion table according to this embodiment will be explained.

Figure 2:
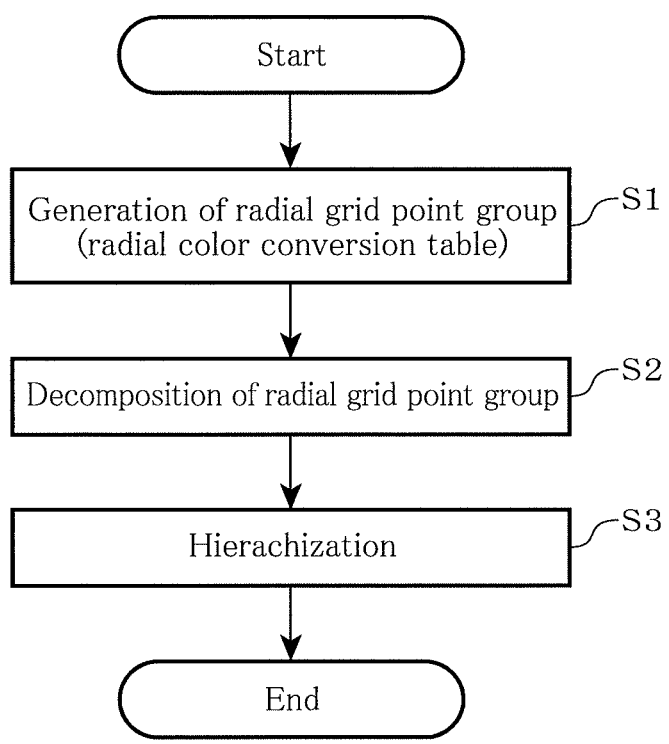
FIG. 2 is a flow chart showing a method of forming a cubic grid color conversion table according to this embodiment.

FIG. 2 is a flow chart showing the method for generating the cubic grid color conversion table according to this embodiment.

As shown in FIG. 2, first, a treatment for generating a group of radial grid points (radial color conversion table Ta) (Step 1) is conducted. Then, the thus generated group of radial grid points (radial color conversion table Tb) is decomposed (Step 2). A cubic grid color conversion table Tb is formed by conducting a hierarchization treatment by stacking the group of grid points for each layer (Step 3).

(Step 1: Generation of Radial Grid Point Group (Radial Color Conversion Table Ta))

In Step 1, the grid point arrangement part 102 divides, a space between basic 6 colors, that is, a space between the line RdYe, the line YeGr, the line GrCy, the line CyBl, the line BlMg and the line MgRd, at an equal interval to increase the number of grid point (color region chroma edge point).

Figure 3:
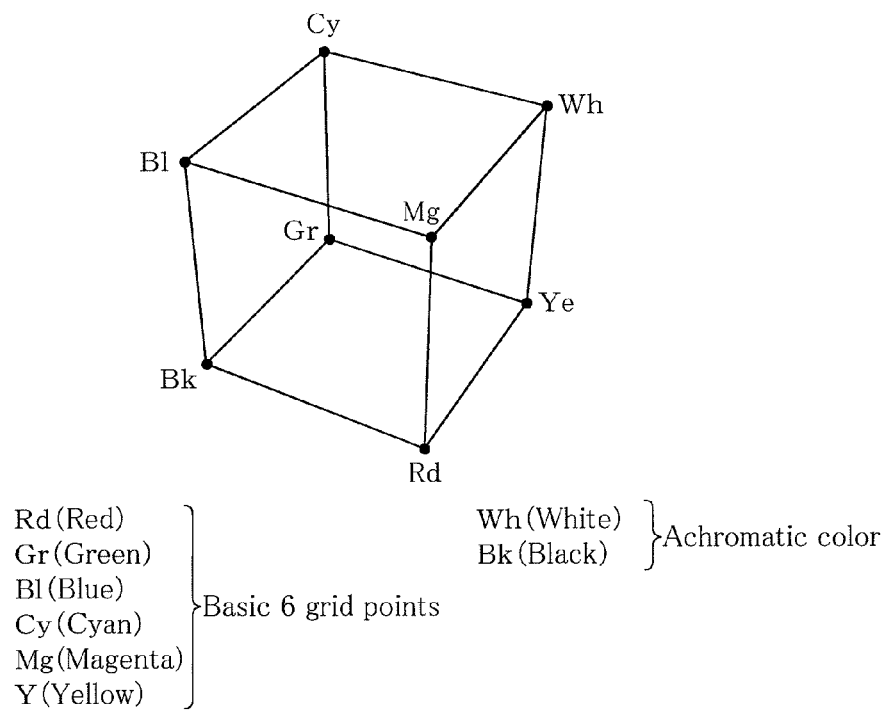
FIG. 3 is a view of a cubic grid showing correspondence of the RGB value and CMY value in the color space of the three-dimensional orthogonal coordinate system.

FIG. 3 is a view of cubic grid showing the correspondence of the RGB value and the CMY value in the color space in the three-dimensional orthogonal coordinate system. For the cubic grid shown in FIG. 3, the grid point arranging part 102 divides a space between adjacent 6 points of Rd (red), Gr (green), Bl (blue), Cy (cyan), Mg (magenta) and Ye (yellow) into N equal parts (N is an arbitral integer) to obtain the color region chroma edge point group. From an arbitral point (chroma saturation point P), a group of points positioned at a hue angle of 180° is obtained.

Figure 4:
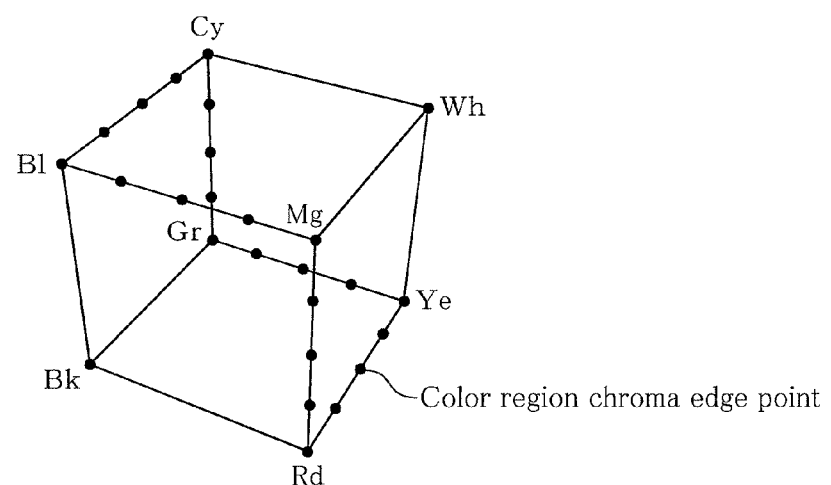
FIG. 4 is a view showing the group of the color region chroma saturation edge points obtained by dividing a space between six adjacent points of Rd (red), Gr (green), Bl (blue), Cy (cyano), Mg (magenta) and Ye (yellow) into an equal interval of 1/N (N=4)

FIG. 4 is a view showing a color region chroma saturation edge point group obtained by dividing a space between adjacent 6 points of Rd (red), Gr (green), Bl (blue), Cy (cyan), Mg (magenta) and Ye (yellow) into N equal parts (N=4) (that is, dividing at an equal interval such as pitch 1/N).

Next, with the black point Bk:{0,0,0} being as the starting point, a close region formed by two vectors with two points, i.e. an arbitral point (chroma saturation point P) and a point of the complementary color thereof (complementary chroma saturation point P') of the color region chroma edge point group, being respectively the ending point is considered.

That is, a hue surface represented by a square region formed of BkPWhP' is considered.

Figure 5:
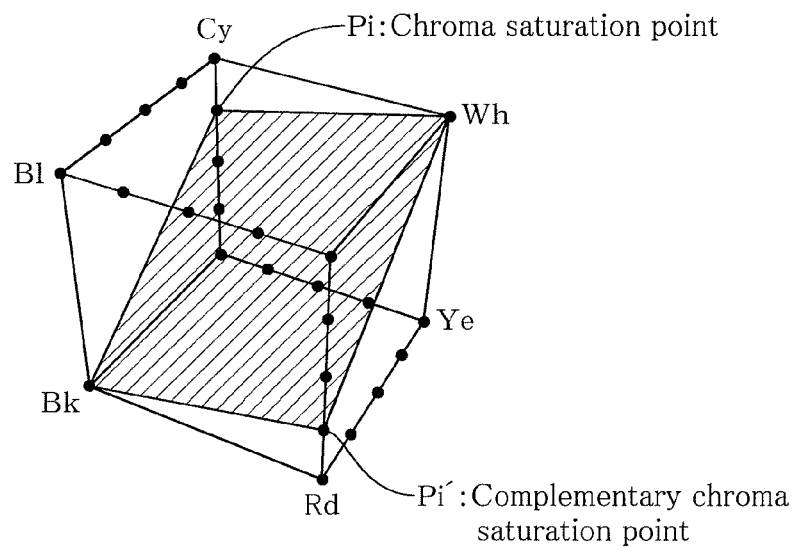
FIG. 5 is a view showing a closed region (square region BkPiWhPi') formed of vector BkPi and vector BkPi'.

FIG. 5 is a view showing a closed region formed by a vector BkPi and a vector BkPi', that is, a square region formed of BkPiWhPi'. Meanwhile, i is an integer according to the number of division N.

Then, the grid point arranging part 102 generates a radial grid point group (radial color conversion table Ta) by forming a grid point at an intersection which is obtained when the line BkP and the line BkP' of this square region is equally divided.

Figure 6:
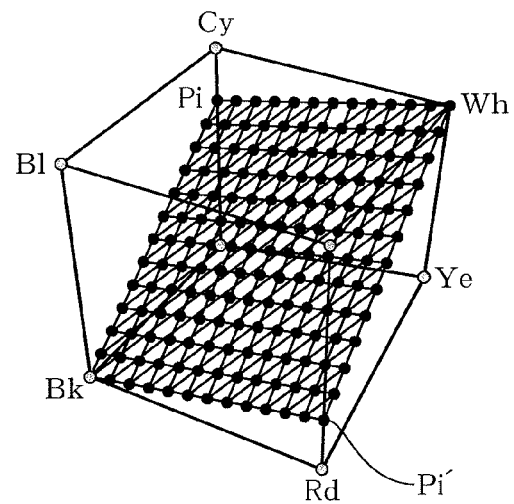
FIG. 6 is a view showing the group of grid points which are arranged at an intersection of a region obtained by dividing the square region BkPiWhPi' at an equal interval of ⅓N (N=4)

FIG. 6 is a view showing the grid point group arranged at an intersection when a square region formed of BkPiWhPi' (hue surface) is divided into M equal parts (M=3N) (that is, when divided at an equal interval of a pitch of 1/M).

Specifically, the grid pint group on each hue surface is calculated according to the following formula (1):

$$\mathrm{Grid}(x) = g \cdot E[\theta] + h \cdot E[\pi + \theta] \qquad (1)$$

wherein g and h indicate total combinations of the decimal numerical sequence of the pitch (1/3N) from 0 to 1.

The grid point arranging part 102 arranges all grid point groups by conducting the above calculation for each combination of the chroma saturation point Pi and the complementary chroma saturation point Pi', that is, by conducting the value which i can take. As a result, it is possible to generate the radial color conversion table Ta in which grid points are arranged for each hue such that they are equally arranged in the radial direction centering around the achromatic color axis.

Here, a specific method for arranging each grid point in the radial color conversion table Ta will be explained with reference to one example. In this example, the number of division N of a space between the basic 6 points and the number of division M on the hue surface are N=4 and M=4, respectively.

Of the color region chroma edge point groups, the point group (Ex group) which is obtained by extracting a point group positioned at a hue angle of 180° can be obtained by the following formula (2):

$$\text{Ex group} = (1-\rho) \cdot E[i] + \rho \cdot E[I+1] \quad (2)$$

(wherein ρ is a number sequence given by a pitch 1/N from 0 to 1).

For example, of the six basic colors, as four points which continue in respect of hue red {1, 0, 0}, magenta {1, 0, 1}, blue {0, 0, 1} and cyano {0, 1, 1} are selected. If the space between adjacent points is divided at an equal interval of a pitch 1/N, the group of color region chroma edge points between each line can be calculated by the following (i) to (iii).

(i) Group of Red-magenta Color Region Chroma Saturation Edge Points: Ex [r-mg]

In this case, E[i]={1, 0, 0}, E[i+1]={1, 0, 1} and ρ={0, 1/4, 2/4, 3/4, 4/4} are substituted in the formula (1).

As a result, Ex[r-mg]: {1, 0, 0}, {1, 0, 1/4}, {1, 0, 1/2}, {1, 0, 3/4} and {1, 0, 1} can be obtained.

That is, the number of the color region chroma saturation edge points in this region will be 5 (=N+1).

(ii) Group of Magenta-blue Color Region Chroma Saturation Edge Points: Ex [mg-b]

In this case, E[i]={1, 0, 1}, E[i+1]={0, 0, 1} and ρ={0,1/4, 2/4,3/4,4/4} are substituted in the formula (1).

As a result, Ex[mg-b]: {1, 0, 1}, {1/4, 0, 1}, {1/2, 0, 1}, {3/4, 0,1} and {0, 0, 1} can be obtained.

That is, the number of the color region chroma saturation edge points in this region will be 5 (=N+1).

(iii) Group of Blue-cyan Color Region Chroma Saturation Edge Points: Ex [b-cy]

In this case, E[i]={0, 0, 1}, E [1+1]={0, 1, 1} and ρ={0,1/4,2/4,3/4,4/4} are substituted in the formula (1).

As a result, Ex[b-cy]: {0, 0, 1}, {0,1/4, 1}, {0,1/2, 0}, {0, 3/4, 1} and {0, 1, 1} can be obtained.

That is, the number of the color region chroma saturation edge points in this region will be 5 (=N+1).

Therefore, the multiple points produced in the joint part of sections are eliminated and they are combined, the color region chroma edge point group [r-cy] corresponding to a hue angle of 180° become as follows.

E[r-cy]:{1,0,0}, {1,0,1/4}, {1,0,1/2}, {1,0,3/4}, {1,0,1}, {1/4,0,1}, {1/2,0,1}, {3/4,0,1}, {0,0,1}, {0,1/4,1}, {0,1/2,1}, {0,3/4,1}, {0,1,1}

That is, in this case (when N=4), the number of group of color region edge points positioned at a hue angle of 180° becomes 13 (3N+1).

Other than the method mentioned above, in the setting of the numerical sequence of ρ, the range from 0 to 1 is not taken as the numerical sequence with a 1/N pitch, and the range from 0 to (1−1/N) is taken as the numerical sequence with a 1/N pitch, whereby Ex[r-mg]', Ex[mg-b]' and Ex[b-cy]' are calculated. Then, these are synthesized, followed by addition of the maximum chroma point of the complementary hue of red, whereby a red-cyan color region edge point group E[r-cy] positioned at a hue angle of 180° can be obtained.

Next, for the color region chroma edge groups positioned at 180° thus obtained, the grid point arranging part 102 arranges grid points at a position which is obtained by subjecting to comprehensive vector addition one obtained by dividing two vectors in which one point of the edge groups and the point of complementary color thereof are respectively taken as the endpoint and the black point is taken as the starting point are respectively divided into an equal part of ⅓N.

That is, the numerical sequence when 0 to 1 is divided at an equal interval at a pitch of 1/M=⅓N, taking the ratio of division as τ is N=4 in this example. Therefore, τ[4] will be {0,1/12,2/12,3/12, . . . , 11/12,1}, and the number of grid points will be 13 (=M+1).

For example, if one of the color region chroma edge point groups is red {1,0,0}, the maximum chroma point of the hue of its complementary color can be obtained by {1,1,1}−{1,0, 0}={0,1,1} (that is cyan). Since the black point is Bk {0,0,0}, the group of grid points [{1,0,0}] on the hue surface formed of a red hue and its complementary hue can be represented as follows by using the above-mentioned formula (1).

$$\text{Grid}[\{1,0,0\}] = g \cdot \{1,0,0\} + h \cdot \{0,1,1\}$$

wherein g and h can be applied to all combinations of a value which τ can take.

In this case, the combination of g and h {g, h} becomes {g, h}:{0,0}, {0,1/12}, {0,2/12}, . . . middle part omitted . . . {0,12/12}, {1/12,0}, {1/12,1/12}, {1/12,2/12}, . . . middle part omitted . . . {1/12,12/12}, {2/12,0}, {2/12,1/12}, {2/12, 2/12}, . . . middle part omitted . . . , {2/12,12/12}, . . . middle part omitted . . . , {12/12,0}, {12/12,1/12}, {12/12,2/12}, . . . middle part omitted . . . {12/12,12/12}.

The group of grid points [{1,0,0}] becomes grid [{1,0,0}]: {0,0,0},{0,1/12,1/12}, . . . middle part omitted . . . , {0,1,1}, {1/12,0,0},{1/12,1/12,1/12}, . . . middle part omitted . . . , {1/12,1,1}, {1/6,0,0},{1/6,1/12,1/12}, . . . middle part omitted . . . , {1/6,1,1}, . . . middle part omitted . . . , {1,0,0}, {1,1/12,1/12}, . . . middle part omitted . . . , {1,1,1}. That is, 169 grid points are arranged on one hue surface.

That is, $(M+1)^2 = (3N+1)^2$ grid points will be generated in one hue surface.

Similarly, to each of other color region chroma edge points within a range of 180°, the above-mentioned grid points are formed and arranged, whereby a radial grid point group (radial color conversion table Ta) will be formed.

Taking one hue surface as one hue layer, and stacking them in a quantity of (3N+1) layers, the total number of the grid points in the cubic grid color conversion table can be obtained by $(3N+1) \cdot (3N+1)^2$. In this example (when N=4), the total number of grid points is $(3 \times 4+1)^3 = 2197$.

Figure 7:
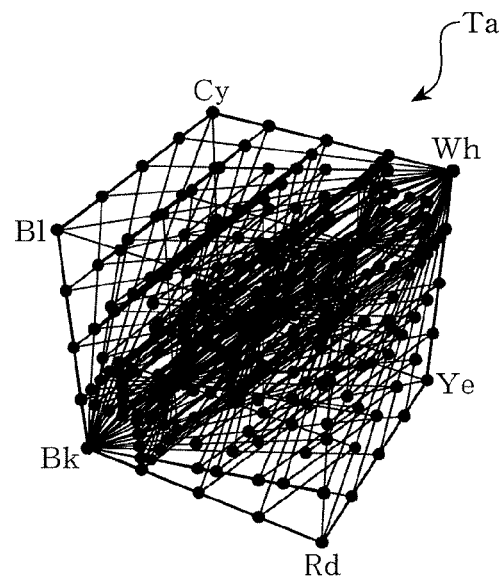
FIG. 7 is a view showing the orthogonal grids (radial color conversion table) in which all grid points are arranged.
Figure 8:
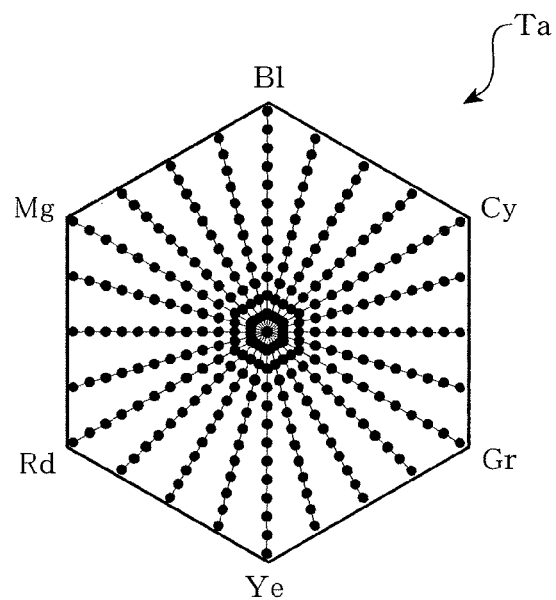
FIG. 8 is a view showing the arrangement of grids when

FIG. 7 is a view showing the manner of orthogonal grids in which all grid points are arranged (radial color conversion table Ta). FIG. 8 is a view showing the arrangement of grid points when FIG. 7 is viewed from the direction of the achromatic color axis. Taking into consideration of easiness in viewing, FIG. 7 shows orthogonal grids consisting of 325 grid points. As shown in these figures, by allowing the conversion point of each color value to be appropriate in the frame of a conventional orthogonal grid color conversion table, a color conversion table Ta in which grid points are radially and equally arranged with the achromatic color axis being the center.

In the meantime, the cubic grid color conversion table according to this embodiment, it is required that the number of layers (3N+1), which are height (z) components of cubic grids and the number of grid points M+1 per side, which are vertical and horizontal (xy) components, on a hue surface be the same.

Therefore, in creating a radial color conversion table, it is required to divide each side of a hue surface on the assumption that M=3N.

In addition, taking into consideration that the radial conversion table Ta is basically formed of 6 colors (RGBCMY), it is preferred that M be a multiple of 6 (6t: t is an arbitral integer). That is, in this case, the number of grid points on a single hue surface (single hue layer) is $(6t+1)^2$, and, in the entire cubic grid color conversion table Tb, the number of grid points becomes $(6t+1)^3$.

Further, when memory configuration or circuit configuration are taken into consideration from a viewpoint of high-speed processing in the orthogonal color conversion table Tb, it is preferred that M be a multiple of 8 (8t). That is, in this case, the number of grid points on a single hue surface (single hue layer) be $(8t+1)^2$ and, in the in the entire cubic grid color conversion table Tb, the number of grid points becomes $(8t+1)^3$.

Further, if these conditions are both taken into consideration, it is preferred that M be the multiple of 24 (24 is the least common multiple of 6 and 8) in respect of arithmetic operation. That is, in this case, the number of grids on a single hue (a single hue layer) becomes $(24t+1)^2$. In the entire cubic grid color conversion table Tb, the number of grids becomes $(24t+1)^3$.

For example, if an assumption is made that M=24, the number of grid points per side on a single hue surface becomes 25 (=M+1), and the number of grid points per single hue surface becomes 625 (=25×25). In order to allow it to be a cubic grid, it is required to allow N to be 8 (=24÷3), thereby to divide a space between basic 6 points.

As a result, a cubic grid formed of a group of grid points 25×25×25 can be formed.

(Step 2: Decomposition of a Group of Radial Grid Points)

In the Step 2, the color conversion restructuring processing part 103 decomposes each grid point in the radial color conversion table Ta for a hue layer formed of an arbitral chroma saturation point P and the hue of its complementary color point (complementary chroma saturation point P').

That is, one surface formed of a surface of a hue and a surface of the hue of its complementary color in the radial color conversion table Ta is taken as a single hue layer and decomposed for each hue layer.

Figure 9:
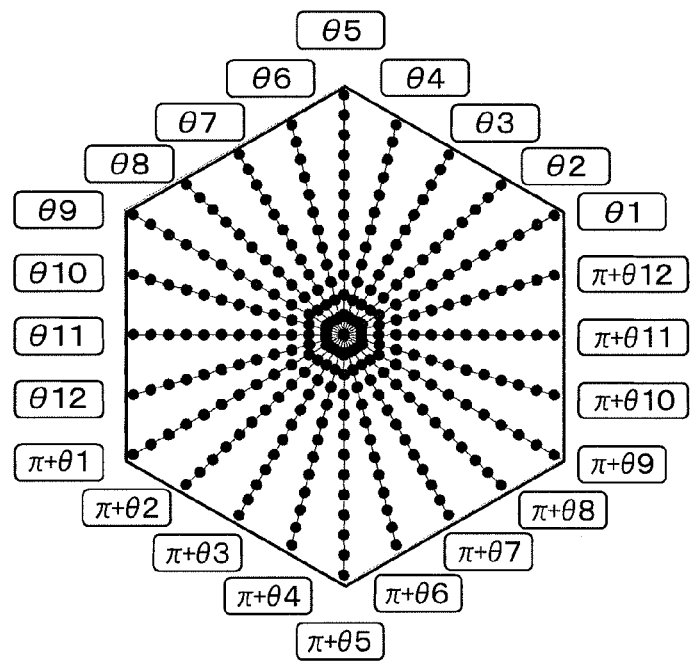
FIG. 9 is a view in which ID is attached for every hue angle in the hue ring shown in FIG. 8.

FIG. 9 is a view in which ID is attached to the hue ring shown in FIG. 8 for every hue angle.

In FIG. 9, θ1 is attached to a red hue. Henceforth, ID is attached in sequence, like θ2, θ3, ... θ12, at every hue angle. θ1+π is attached to a cyan hue which is a complementary color of red. Henceforth, in corresponding to θ2 to θ12, ID is attached in sequence, like θ2+π, θ3+π, ... θ12+π, at every hue angle.

The hue of θ and the hue of θ+π shown in FIG. 9 shows that they are complementary hues.

Figure 10:
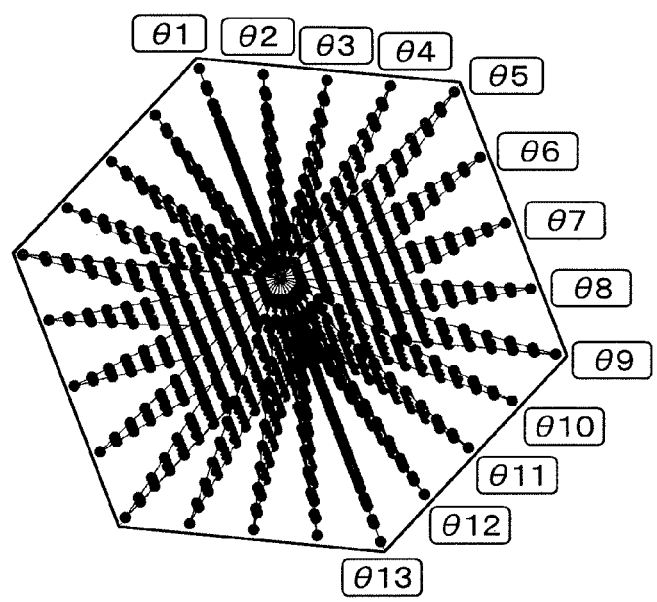
FIG. 10 is a view when each hue layer is viewed from the oblique direction of the achromatic color axis; i.e. the Wh side or the Bk side.

FIG. 10 is a view when each hue layer is viewed from the oblique direction of the achromatic color axis, i.e. the Wh side or the Bk side.

Figure 11:
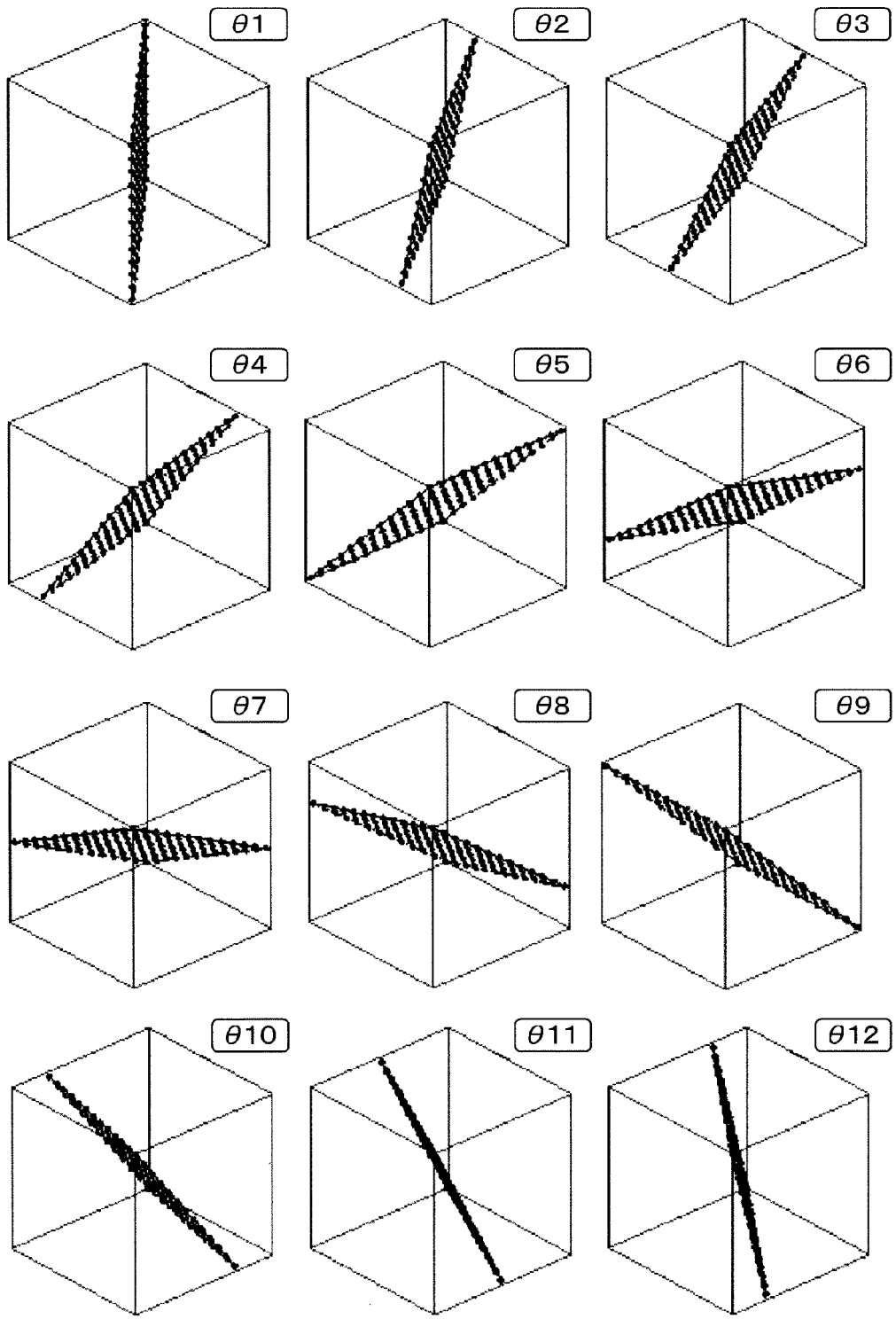
FIG. 11 is a view showing each hue layer for one ID.

FIG. 11 is a view in which each hue layer is shown for each ID.

The color conversion table restructuring processing part 103 decomposes and takes out each hue surface from the group of grids forming the radial color conversion table Ta.

Figure 12:
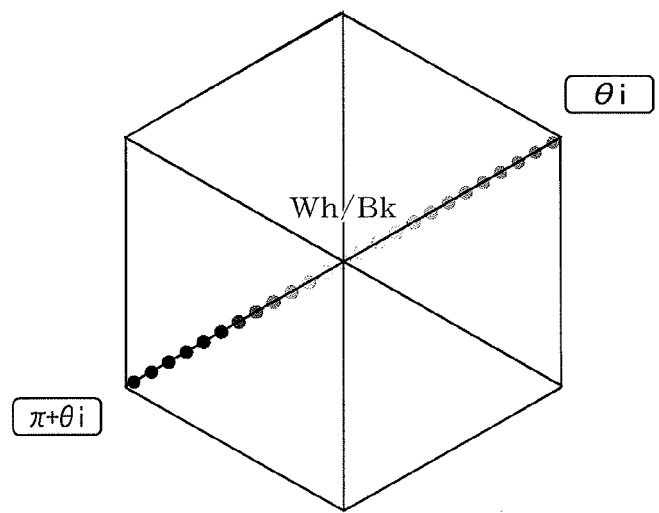
FIG. 12 is a view showing one hue layer viewed from the direction of the achromatic color axis.
Figure 13:
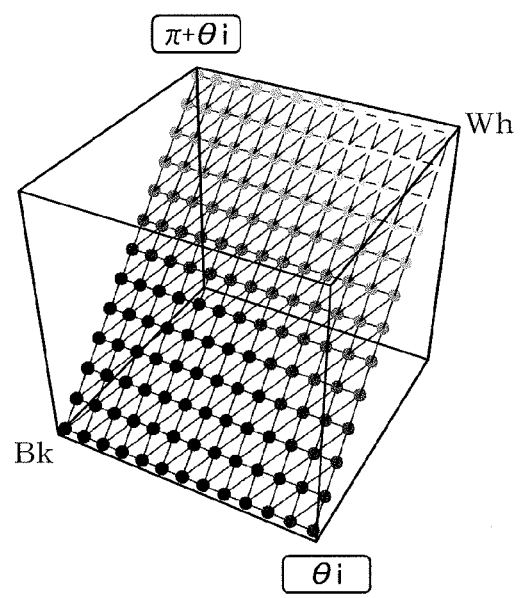
FIG. 13 is a view showing the hue layer shown in FIG. 12 viewed from the oblique direction.

FIG. 12 is a view when one hue layer is viewed from the direction of the achromatic color axis, and FIG. 13 is a view when the hue layer shown in FIG. 12 is viewed from the oblique direction.

That is, as shown in figures, in a single hue layer, a single hue surface according to an arbitral hue (θi) and a hue surface according to a hue of its complementary color (θi+π) are on the same plane, these are line-symmetrically overlapped with each other with the achromatic color axis as its shaft, whereby a single hue layer (θi) can be formed.

Figure 14:
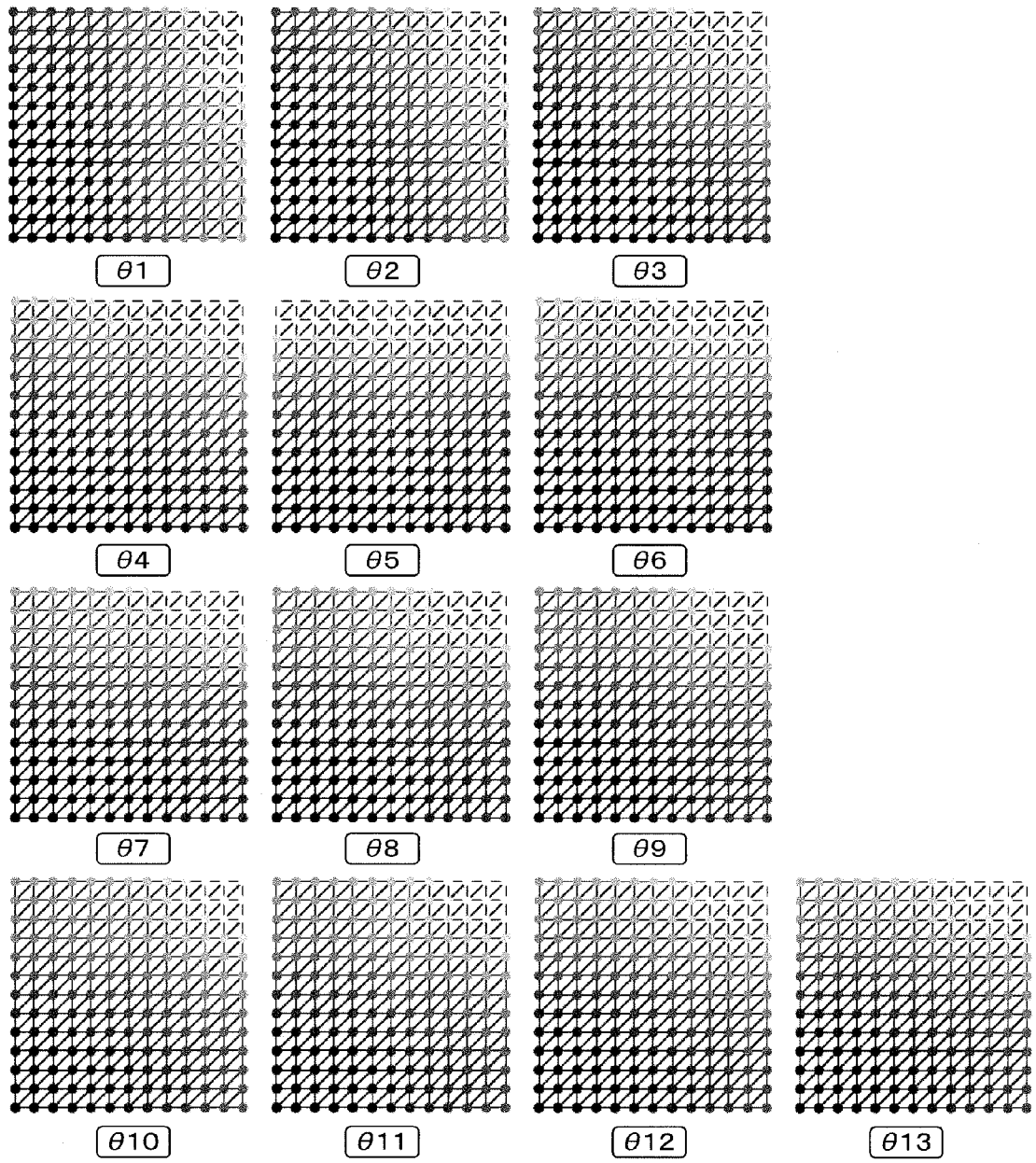
FIG. 14 is a view in which each hue layer is arranged in the order of ID (the order of hue)

FIG. 14 is a view in which each hue layer is overlapped in the order of ID.

If the number of division pitch is ⅓N (N=4), 13 hue layers ranging from (θ1) to (θ13) can be taken out.

(Step 3: Hierarchization Treatment)

The color conversion restructuring processing part 103 generates the cubic grid color conversion table Tb in which a group of radial grid points are allowed to be in a hierarchization structure by stacking each hue layer which has been taken out in the order of ID (order of hue).

Figure 15:
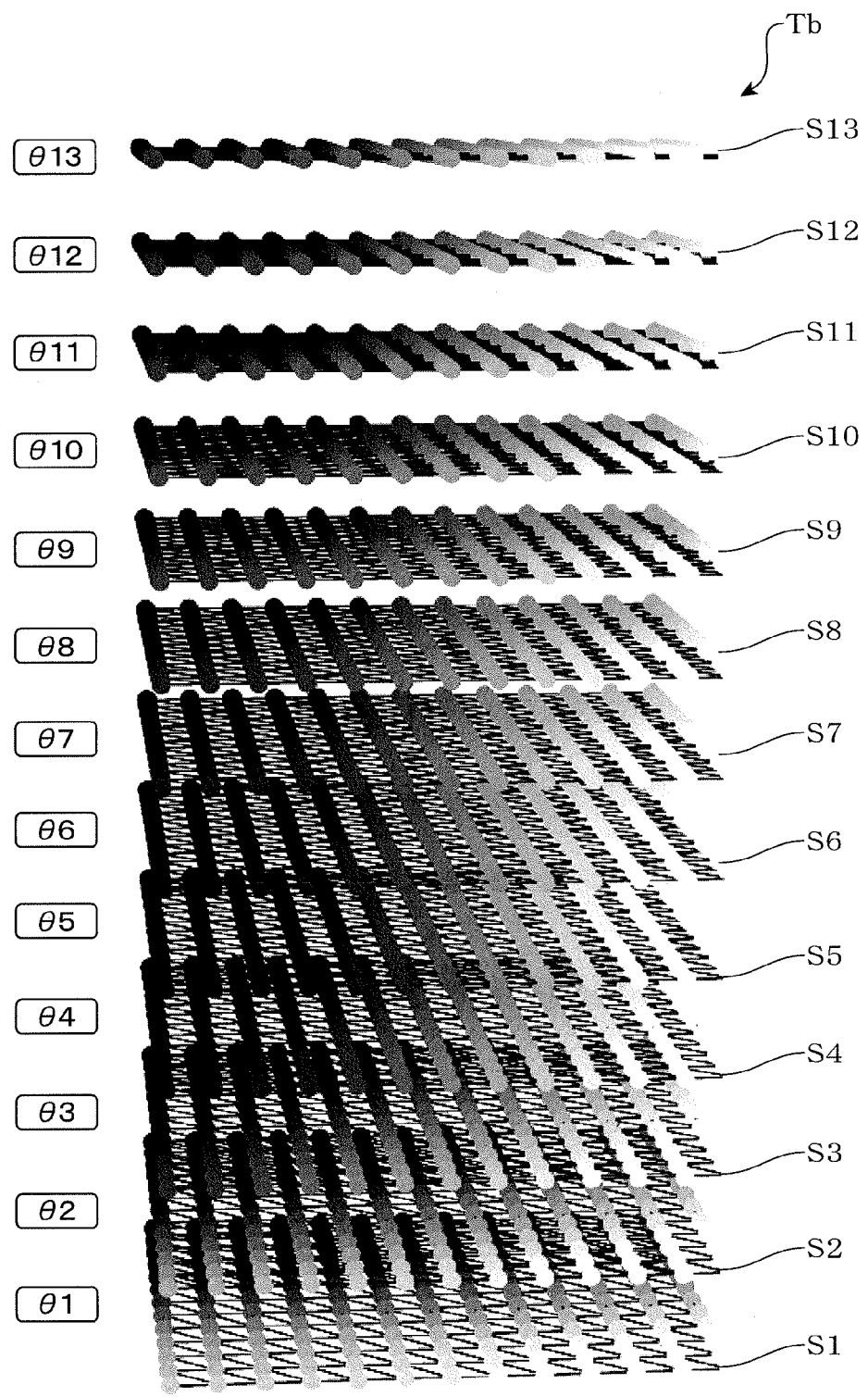
FIG. 15 is a view showing a cubic grid color conversion table.

FIG. 15 is a view showing the cubic grid conversion type color table Tb.

That is, as shown in FIG. 15, by stacking in the order of ID (descending or ascending order) each hue layer S1 to S13 to which ID θ1 to θ13 have been attached, it is possible to generate a three-dimensional cubic grid color conversion table Tb.

Figure 16:
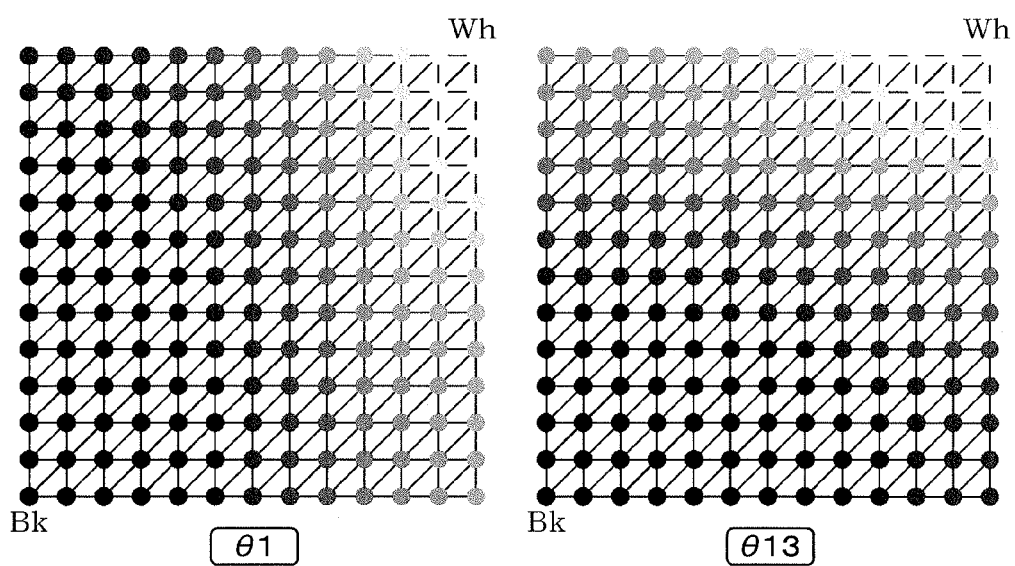
FIG. 16 is a view showing the first hue layer and the last hue layer.

FIG. 16 is a view showing the first hue layer and the final hue layer.

As shown in FIG. 16, the first hue layer (θ1) and the final hue layer (θ13) have a relationship in which arrangement of grid point group of each layer has a line symmetrical relationship with the achromatic color axis (Wh to Bk) being a symmetrical shaft.

Therefore, for the final hue layer, it is possible to stack the first hue layer in which only the coordinate information of the grid point group has been exchanged can be stacked as the final hue layer.

That is, it is possible to generate 13 hue layers of θ1 to θ13, not by decomposing and taking out all hue layers of θ1 to θ13, but by generating hue layers of θ1 to θ12, and adding a hue layer (θ13) which has been arranged by reversing the grid point group of the hue layer of θ1 with the achromatic color axis being as its base.

In this way, troublesome treatments which are necessary for generating the grid point group of the final hue layer or decomposing the thus generated final hue layer to take out the grid point group can be suppressed.

In generating the cubic grid color conversion table Tb, an explanation will be made below on the method for corresponding the RGB value of each grid point with the corresponding CMYK value.

First, in an image-forming device such as a color printer in which full-color printing is conducted by using four color inks of CMYK, a color patch is formed by combining the color value of CMYK variously, and the color patch is then subjected to spectrometry, thereby to correspond the CMYK value to the value of color system which does not depend on a device. Further, by converting reversely this, a "correspondence of the value of color system which does not depend on a device with the CMYK value corresponding thereto" is prepared in advance.

For example, in a color patch, a CMYK value is set at a linear equal interval such as {0, 20, 40, 60, 80, 100}, and then, a CMYK value is set in a non-liner manner such as {0, 10, 20, 40, 70, 100}, or, after stratifying based on the amount of Indian ink, a radial grid point group is formed based on a CMY value. The CMYK value is combined with the Bk value according to the amount of Indian ink which has been stratified, thereby to set various CMYK values to print various color patches. Then, a table is formed in which the CMYK value of the color patch which has been printed and the device-non-dependent color value which is obtained by subjecting this CMYK value to spectrometry.

Then, for each grid point of the radial color conversion table Ta, the color value (CIE-XYZ, CIE-Lab or the like) of the device-non-dependent color system corresponding to the RGB value is obtained. The color value of the device-non-dependent color system can be obtained by using a device profile (ICC Profile or the like) in which the features or characteristics of a device derived from a RGB value or, if the RGB device is standard data such as sRGB or AdobeRGB of which the specification has already been published, by substituting the RGB value of each grid point constituting the radial color conversion table according to the definition.

Further, the color space defined by the RGB value is commonly different in shape from the color space of an output device. The mapping between the input device and the output device is subjected to non-linear structural coordinate transformation in the device-non-dependent color space. Therefore, the value after being converted on the non-linear coordinates can be defined as the "color value of device-non-dependent color system corresponding to a RGB value".

The "RGB value and the color value of device-non-dependent color system corresponding thereto" obtained for the grid point in the radial color conversion table Ta is substituted in the "correspondence of the color value of device-non-dependent color system with the corresponding CMYK value", which is previously prepared, followed by conversion, and then interpolation is conducted if necessary, whereby a CMYK value is obtained.

By assigning the thus obtained CMYK value with the RGB value at the grid point in the original radial color conversion table Ta, whereby correspondence of the RGB value and the CMYK value at the corresponding grid point of the cubic grid color conversion table Tb is completed.

As mentioned above, according to the color conversion device and the image-forming device of this embodiment, while maintaining the characteristics of the radial color conversion Ta based on the component such as brightness, chroma and hue, color conversion is conducted by using the cubic color conversion table Tb obtained by conforming this table to the conventional cubic grid color conversion table.

Therefore, adequate color conversion or color adjustment which is suited to the sense of color of a human being can become possible, and high degree of integrity, compatibility and affinity for existing device or system can be attained.
(Color Conversion Method)

Next, the color conversion method in the above-mentioned color conversion device or the image-forming device will be explained.

Figure 17:
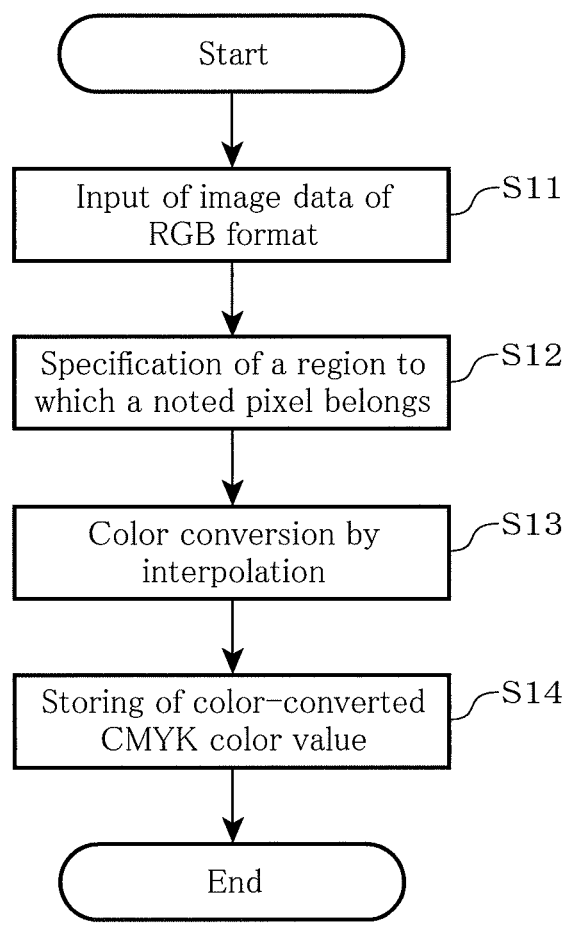
FIG. 17 is a flow chart showing a color conversion method using the color conversion device or the image-forming device according to this embodiment.

FIG. 17 is a flow chart for explaining the color conversion method in the color conversion device or the image-forming device according to this embodiment.

As shown in FIG. 17, the image information input part 101 inputs image data of RGB format (Step 11).

Subsequently, the color conversion processing part 104 specifies, in converting the RGB value of each pixel of the input image data into the CMK value, a region in which a noted pixel belongs (Step 12) and conduct the color conversion of the noted pixel by interpolation calculation by using the thus specified region to which the pixel belongs (Step 13).

The CMYK value obtained by color conversion by the interpolation is stored in the storing part 105 (Step 14).

Further, if a CMYK value corresponding to a certain pixel (for example, a pixel corresponding to unit page) is stored, the image information output part 106 takes out the image data from the storing part 105, and the data is output.
(Interpolation)

Here, interpolation in steps 12 to 13 will be explained in detail.

As the specific interpolation method, the first interpolation method and the second interpolation method are explained.

In these interpolation methods, irrespective of a fact that the conversion point is coincident with each grid point of the orthogonal grid color conversion table Tb, color conversion of the conversion point becomes possible. As a result, a color conversion treatment can be conducted smoothly without the need of judging whether the conversion point is coincident with the grid point.
(First Interpolation Method)

Figure 18:
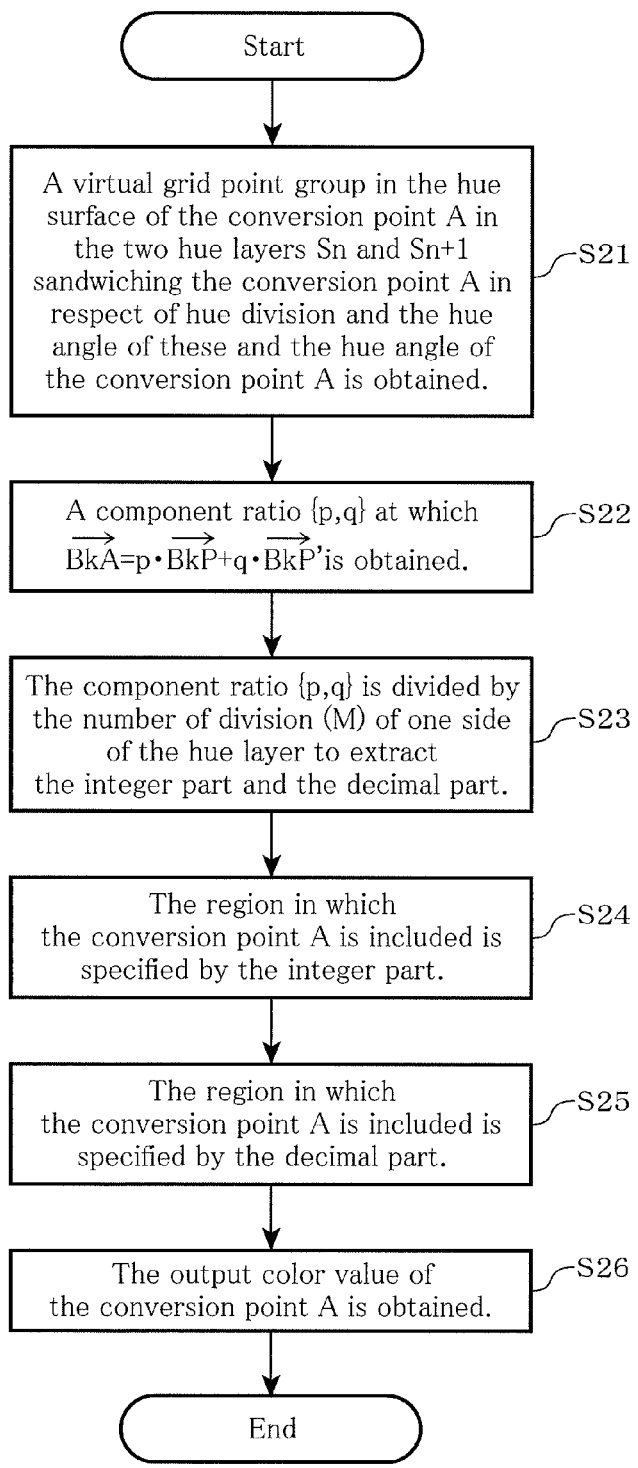
FIG. 18 is a flow chart showing a first interpolating method for obtaining the output color value at the conversion point.

FIG. 18 is a flow chart for explaining the first interpolation method for obtaining the output color value of the noted pixel.

As shown in FIG. 18, here, at first, based on the coordinate of grid points and the hue angle thereof on the two hue layers interposing the conversion point A in respect of hue division (adjacent hue layers, that is the radial hue surface in the vicinity of the clockwise or the counterclockwise of the conversion point) and the hue angle of the conversion point, the "virtual grid point group corresponding to the grid point group in the hue surface" of the conversion point A (Step 21).

FIG. 19 is a view showing the hue surface Sa to which the conversion point A belongs, the virtual grid point group $Sa_{ij}$ in the hue surface Sa, and two hue layers Sn and Sn+1 which sandwich the conversion point A (hue surface Sa) in respect of hue division.

As shown in FIG. 19, the virtual grid point (group) $Sa_{ij}$ is regarded as the grid point group which exists in the hue surface Sa sandwiched between the hue layer Sn and the hue layer Sn+1 which continue in respect of hue division.

Figure 19A:
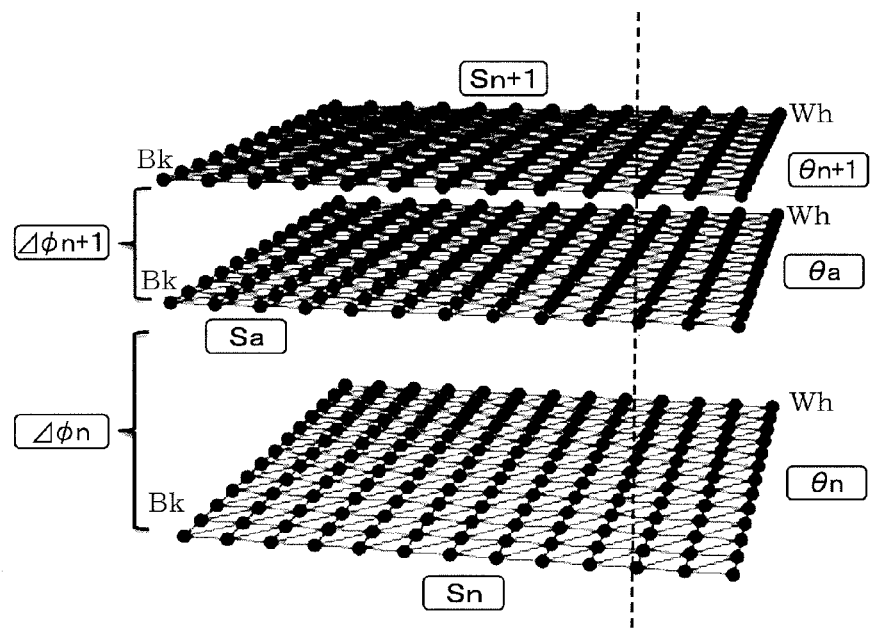
FIG. 19A is a view showing an entire view of a hue surface Sa to which the conversion point A belongs, a virtual group of grids $Sa_{ij}$ in the hue surface Sa and two hue layers Sn and Sn+1 which sandwich the conversion point A (hue surface Sa) in respect hue section.
Figure 19B:
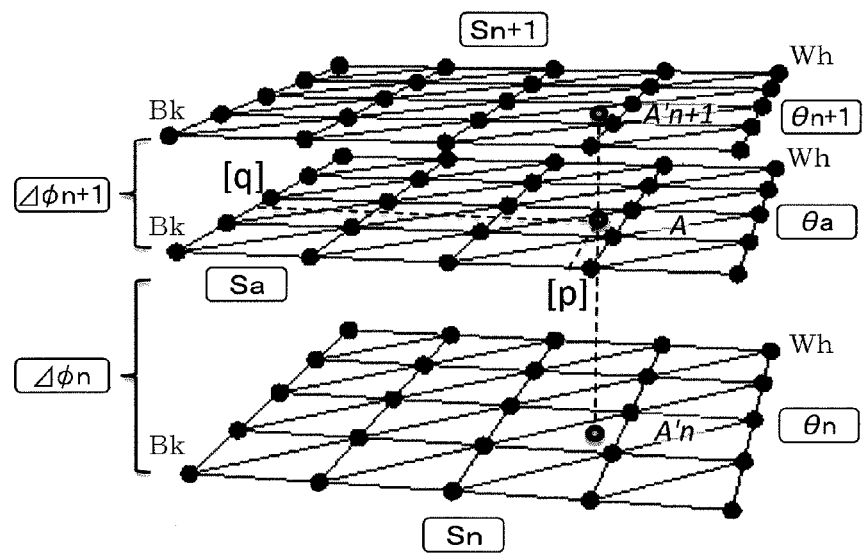
FIG. 19B is a view showing a partial enlarged view of FIG. 19A.

In the meantime, FIG. 19A is a view showing the entire view of the hue surface Sa and the hue layers Sn and Sn+1, and FIG. 19B is a partial enlarged view of FIG. 19A.

Therefore, the virtual grid point group $Sa_{ij}$ in the hue surface Sa in the conversion point A can be calculated by the following formula (3) based on the grid point group $Sn_{ij}$ in the hue layer Sn, the grid point group $Sn+1_{ij}$ in the hue layer Sn+1, the hue angle $\Delta\phi$ of the hue layer Sn and the hue surface Sa, the hue angle $\Delta\phi_{n+1}$ of the hue layer Sn+1 and the hue surface Sa.

$$Sa_{ij}=Sn+1_{ij}\cdot\Delta\phi_n/(\Delta\phi_n+\Delta\phi_{n+1})+Sn_{ij}\cdot\Delta\phi_{n+1}/(\Delta\phi_n+\Delta\phi_{n+1}) \quad (3)$$

In the above-mentioned formula (3), $\Delta\phi n$ and $\Delta\phi n+1$ can be obtained by the following formula (4):

$$\{\Delta\phi_n,\Delta\phi_{n+1}\}=\{|\theta n-\theta a|,|\theta a-\theta n+1|\} \quad (4)$$

In addition, when a higher accuracy is required when $\{\Delta\phi_n, \Delta\phi_{n+1}\}$ is not sufficiently small in regard of the accuracy of conversion, and hence it cannot be regarded as $\sin \Delta\phi_n \approx \Delta\phi_n$, $\sin \Delta\phi_{n+1} \approx \Delta\phi_{n+1}$, or the like, $Sa_{ij}$ can be calculated by the following formula (5):

$$Sa_{ij}=Sn+1_{ij}\cdot HSn_{ij}\cdot\sin \Delta\phi_n/(HSn_{ij}\sin \Delta\phi_n+HSn+1_{ij}\cdot\sin \Delta\phi_{n+1})+Sn_{ij}HSn+1\cdot\sin \Delta\phi_{n+1}/(HSn\cdot\sin \Delta\phi_n+HSn+1\cdot\sin \Delta\phi_{n+1}) \quad (5)$$

wherein H is a point corresponding to the leg of the altitude taken down from the grid point included in the grid point group $Sn_{ij}$ and $Sn+1_{ij}$ to the achromatic color axis, and $HSn_{ij}$ and $HSn+1_{ij}$ each show the distance from the point H on the achromatic color axis to each grid point.

Next, in the hue surface Sa, a component ratio {p,q} at which $$BkA\uparrow = p\text{-}BkP\uparrow + q\text{-}BkP'\uparrow \qquad (6)$$

(Step 22) is obtained (wherein ↑ is vector, and the same will be applied hereinbelow).

The component ratio {p,q} can be calculated by setting up an equation of the above-mentioned equation (6) for every channel component, and solving it simultaneously. Here, the component ratio {p,q}={0.7, 0.35} is assumed to be calculated.

Then, the component ratio {p,q} is divided by the number of division of one side of the hue layers Sn and Sn+1 to extract an integer part and a decimal part (Step 23), and specify a region in which the conversion point A is included by using the integer part and the decimal part (Steps 24 and 25).

Figure 20A:
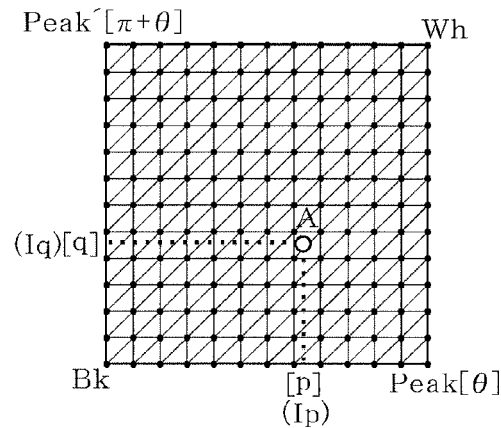
FIG. 20A is a view for explaining a method for specifying a region including the conversion point A.
Figure 20B:
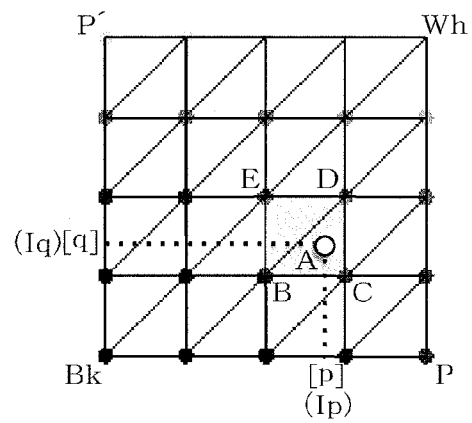
FIG. 20B is another view for explaining the method for specifying the region including the conversion point A.

FIG. 20 is a view for explaining the method for specifying the region in which the conversion point A is included.

Here, an explanation is made on the method for specifying the region in which the conversion point A is included in the square region BkPWhP' in an arbitral hue layer.

As shown in FIG. 20, each side of the square region of the hue layer is divided at a division pitch of (1/M=1/4). Therefore, the component ratio {0.7, 0.35} is divided by this division pitch, whereby an integer part Ip relating to p and the integer part Iq, the decimal part Fp, the integer part Iq relating to q and the decimal part Fq are calculated.

As a result, Ip=2, Fp=0.8, Iq=1 and Fq=0.4 are obtained.

Here, the integer part indicates in which region counted from Bk the conversion point A is included and the decimal part indicates the division ratio between grid points of the conversion point A in the block of region in which it is included.

Therefore, when expressed as p=Ip+Fp and q=Iq+Fq, the conversion point A is present in a region block BCDE which is at the {Ip,Iq}={2,1} counted from Bk, and in the region block BCDE, the conversion point A is arranged at a point which divides a space between the grid point at a division ratio of {Fp,Fq}={0.8,0.4}.

In this way, the region in which the conversion point A is included (a region to which it belongs) can be specified.

Then, based on the specified region in which the conversion point A is included, the output color value (CMYK value) of the conversion point A is obtained (Step 26).

Figure 21:
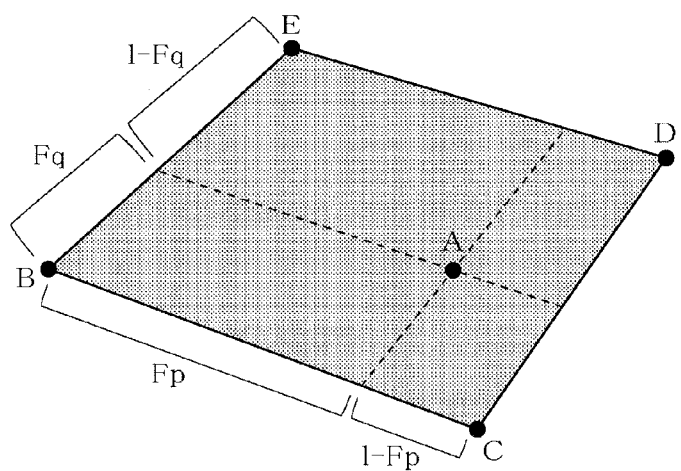
FIG. 21 is a view showing the positional relationship of the conversion point A in the region block BCDE.

Specifically, since the positional relationship of the conversion point A in the block BCDE is as shown in FIG. 21, the output color value of the conversion point A can be calculated by the following formula (7) based on the CMYK value according to the each grid point B, C, D and E.

$$A = (1-Fp)\cdot(1-Fq)\cdot B + Fp\cdot(1-Fq)\cdot C + Fp\cdot Fq\cdot D + (1-Fp)\cdot Fq\cdot E \qquad (7)$$

The output color value of the conversion point A can be obtained also by other methods.

First, after specifying the region block {Ip,Iq} in which the conversion point A is included, a triangle region where the conversion point A exists can be specified by comparing the size of Fp and Fq.

Specifically, when Fp≤Fq, the conversion point A is included the ΔBDC region, and when Fp>Fq, the conversion point A is included in the ΔBDE region.

Figure 22:
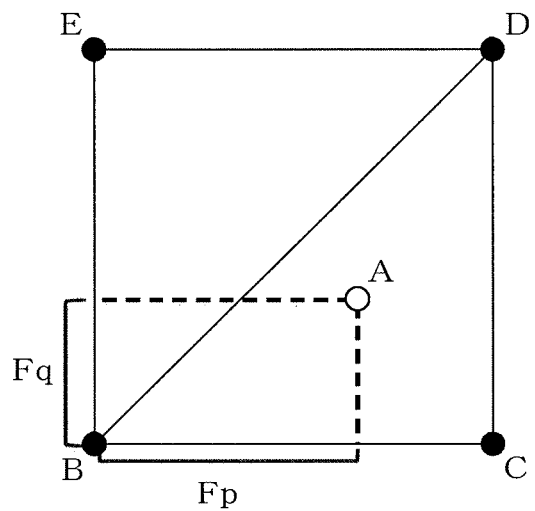
FIG. 22 is a view for explaining a method for specifying the region including the conversion point A.

For example, as shown in FIG. 22, when Fp≤Fq, the triangle region which includes the conversion point A can be specified as ΔBDC.

Based on the information regarding the three grid points constituting the triangle specified by such judgment and the ratio at which the conversion point A in the triangle region divides the area, the CMYK value of the conversion point A can be calculated.

Figure 23:
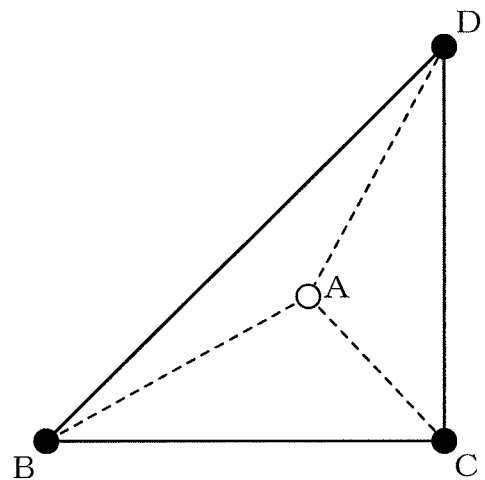
FIG. 23 is a view for explaining a method for obtaining the conversion point A based on a triangle region including the conversion point A.

FIG. 23 is a view for explaining the method for obtaining the conversion point A based on the triangle region including the conversion point A.

Specifically, when the triangle (region) including the conversion point A is assumed to be ΔBCD, with the opposite side of each vertex of ΔBCD being as a base, an area ratio of three triangles each have the conversion point A as its vertex to ΔBCD is obtained, and the thus obtained area ratio is multiplied with the vertex coordinate, followed by synthesis, whereby the coordinate of the conversion point A can be obtained.

That is, the output color value can be calculated by the following formula (8) based on the CMYK value according to each grid point B, C and D, which is the known coordinate.

$$A = \alpha\cdot B + \beta\cdot C + \gamma\cdot D \qquad (8)$$

wherein α=area of ΔACD/area of ΔBCD, β=area of ΔABD/area of ΔBCD, γ=area of ΔABC/area of ΔBCD)

The area of the triangle can also be obtained by a method in which two vectors which has, of the three points, one point as the starting point and the remaining two points as the ending points, and multiply 0.5 times the outer product of these vectors, for example. Further, the area of the triangle can be obtained by obtaining the length of each side, followed by application of the Heron's formula.

(Second Interpolation Method)

Figure 24:
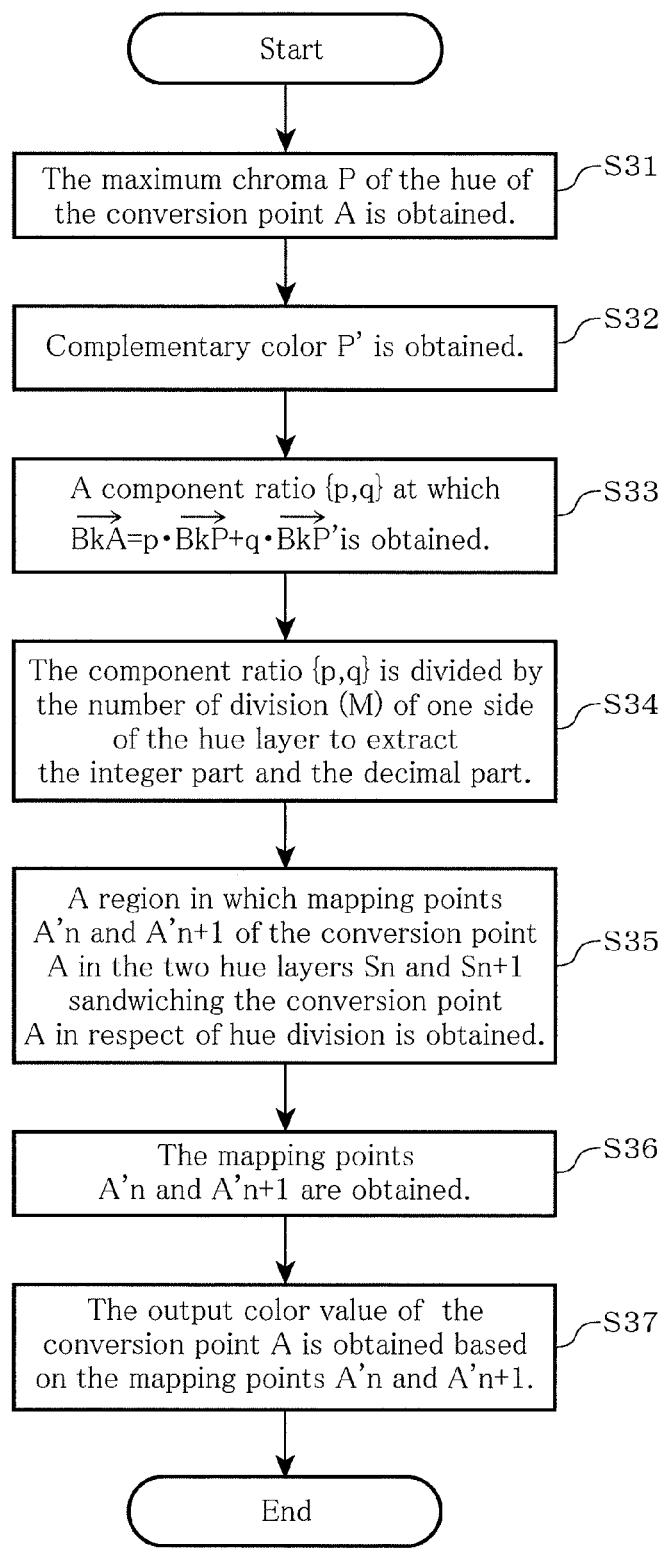
FIG. 24 is a flow chart showing a second interpolating method for obtaining the output color value at the conversion point.

FIG. 24 is a flow chart showing the second interpolation method.

Figure 25A:
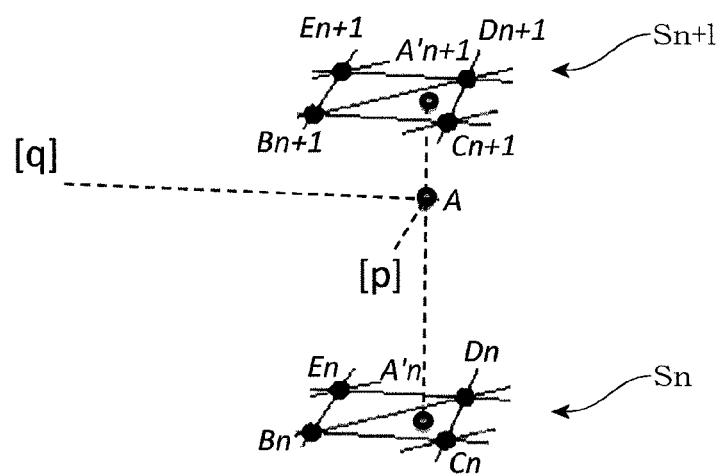
FIG. 25A is a view showing a cubic (8 points) interpolation method (a)
Figure 25B:
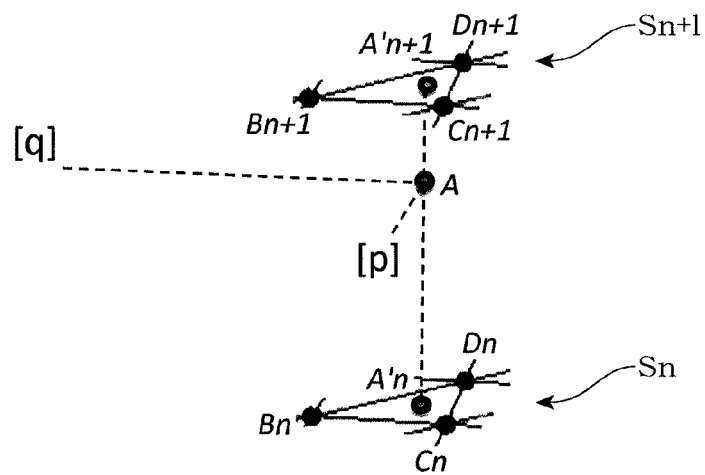
FIG. 25B is a view showing a triangular prism (6 points) interpolation method.

Here, as shown in FIG. 25, the conversion point A can be obtained by the cubic interpolation method (a) using 8 points corresponding to the vertexes of a rectangular cube or a cube including the conversion point A, or by the triangular prism interpolation method using 6 points corresponding to the vertexes of a triangular prism including the conversion point A, of the triangular prisms obtained by dividing along the diagonal direction of the rectangular cube or the cube.

That is, the positional relationship between the square region or the triangle region including mapping points A'n and A'n+1 of the conversion point A in the adjacent hue layers Sn and Sn+1 sandwiching the hue surface Sa (that is, the radial hue surface in the clockwise or counterclockwise vicinity of the conversion point A) and the conversion point A is obtained. The conversion point A is obtained based on the internal ratio of Sa in Sn to Sn+1.

As shown in FIG. 24, at first, the maximum chroma of the hue of the conversion point A is obtained (Step 31).

The maximum chroma saturation point (chroma saturation point) P of the hue of the conversion point A (that is, the same hue as that of the conversion point A) can be calculated by the following formula (9).

$$P = (A-\text{Min}[A])/\text{Max}[(A-\text{Min}[A])] \qquad (9)$$

wherein Min [A] is the minimum value of the three components of the conversion point A:{Ax, Ay, Az} coordinate. Moreover, A−Min[A] is one obtained by deducing from each coordinate component the minimum value of the three components of the conversion point A and Max[(A−Min [A])] is the maximum value of the three components of A−Min[A].

Next, the complementary color of the maximum chroma obtained in the previous step is obtained (Step 32).

The complementary color point (complementary color chroma saturation point) P' can be calculated by the following formula (10):

$$P' = \{1,1,1\} - P \qquad (10)$$

For example, the complementary color point P' when the maximum chroma point P={1,0,0} (red) is P'={1,1,1}−{1,0,0}={0,1,1} (cyan).

Subsequently, the component ratio {p,q} at which BkA↑=p·BkP↑+q·BkP'↑ is obtained (Step 33), the component ratio {p,q} is divided by the number of division (M) of one side of the hue layers Sn and Sn+1, whereby the integer part and the decimal part are extracted (Step 34).

The above-mentioned Steps 33 to 34 correspond to Steps 22 to 23 in FIG. 18. Therefore, a detailed explanation of these steps is omitted here.

Next, a region in which the mapping points A'n and A'n+1 of the conversion point A in the two hue layers Sn and Sn+1 sandwiching the conversion point A in respect of hue division is specified (Step 35).

For this specification, the same method as that in the "method for specifying the region in which the conversion point A is included" in the first interpolation method (Steps 23 to 25) is used.

That is, by using the integer part {Ip,Iq} obtained in Step 34, the region block $B_n C_n D_n E_n$ which includes the mapping point A'n in the hue layer Sn is specified.

Similarly, the region block $B_{n+1} C_{n+1} D_{n+1} E_{n+1}$ which includes the mapping point A'n+1 the hue layer Sn+1 is specified.

As a result, 8 vertexes ($B_n C_n D_n E_n$, $B_{n+1} C_{n+1} D_{n+1} E_{n+1}$) which are necessary for the cubic interpolation method can be obtained.

Meanwhile, in the case of the triangular prism interpolation method, 6 points ($B_n C_n D_n$, $B_{n+1} C_{n+1} D_{n+1}$) corresponding to the vertexes of the triangular prism can be obtained by the above-mentioned method for specifying the triangle region (see FIG. 22 and the explanation corresponding thereto).

Subsequently, the mapping points A'n and A'n+1 are obtained (Step 36).

In order to calculate the mapping points A'n and A'n+1, the same method as that used for obtaining the output color value of the conversion point A in the above-mentioned first interpolation method is used (see the formula 7).

Figure 26:
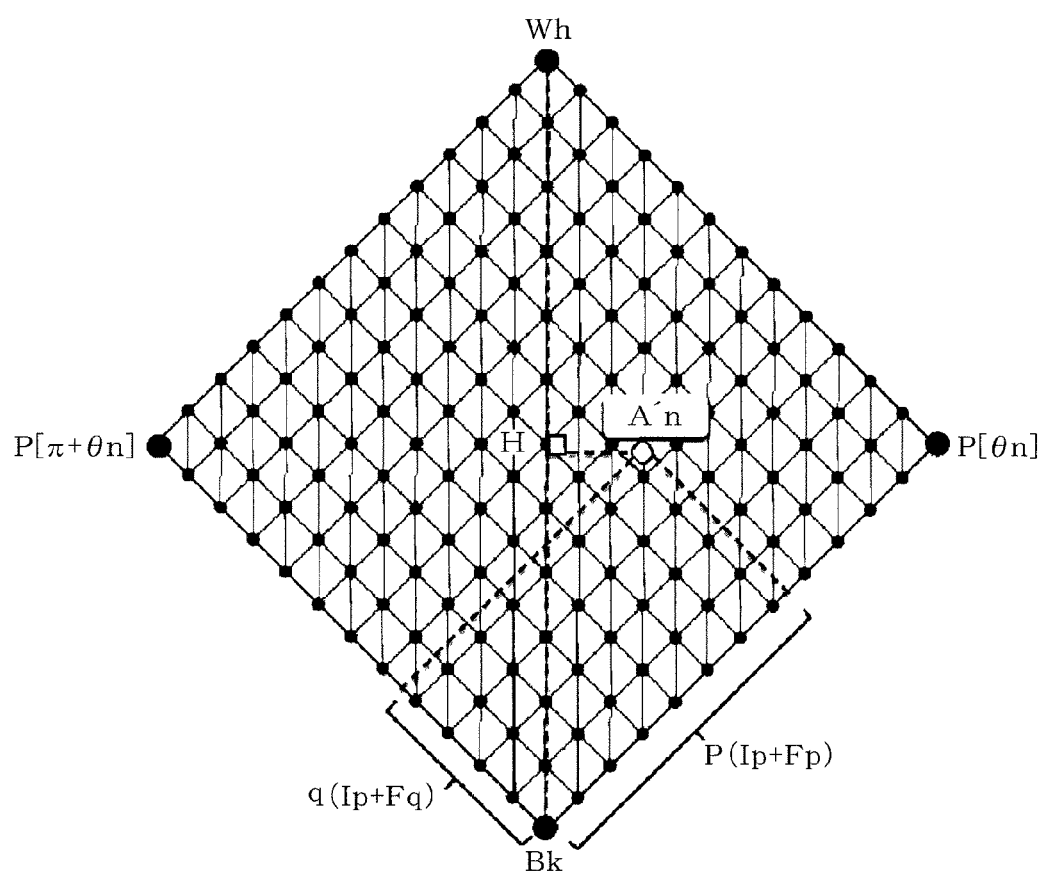
FIG. 26 is a view showing a method for obtaining a mapping point A'n.

That is, as shown in FIG. 26, when p=Ip+Fp, q=Iq+Fq, the mapping point A'n is present in the region block $B_n C_n D_n E_n$ which is at the {Ip, Iq} counted from Bk.

Then, in this region block $B_n C_n D_n E_n$, the mapping point A'n is arranged at a position at which a space between the grid points is divided at a division ratio of {Fp,Fq}.

Therefore, by using the following formula (11) in which the CMYK value which has been assigned in advance to $B_n$, $C_n$, $D_n$ and $E_n$ and the decimal part {Fp, Fq} are used, the output color value of the mapping point An' is obtained.

$$A'n=(1-Fp)\cdot(1-Fq)\cdot B_n+Fp\cdot(1-Fq)\cdot C_n+Fp\cdot Fq\cdot D_n+(1-Fp)\cdot Fq\cdot E_n \quad (11)$$

Similarly, the output color value of the mapping point A'n+1 is obtained by the following formula (12).

$$A'n+1=(1-Fp)\cdot(1-Fq)\cdot B_{n+1}+Fp\cdot(1-Fq)\cdot C_{n+1}+Fp\cdot Fq\cdot D_{n+1}+(1-Fp)\cdot Fq\cdot E_{n+1} \quad (12)$$

Then, based on the mapping points A'n and A'n+1, the output color value of the conversion point A is obtained (Step 37).

Figure 27:
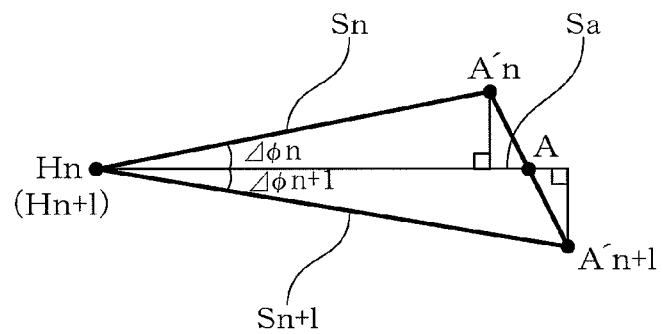
FIG. 27 is a view showing a method for obtaining the conversion point A based on mapping points A'n and A'n+1.
Figure 28:
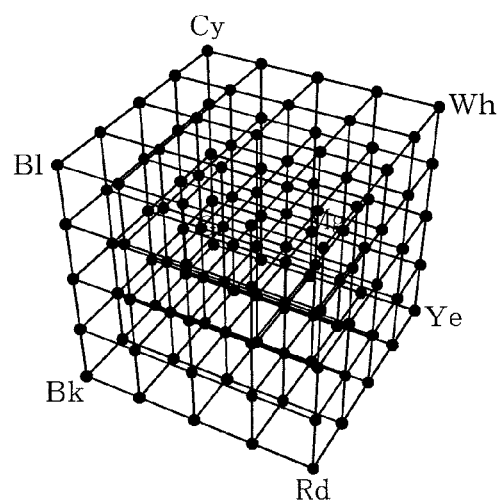
FIG. 28 is a schematic view of a color conversion table of RGB-CMYK represented by orthogonal grids of the three-dimensional orthogonal coordinate system.
Figure 29:
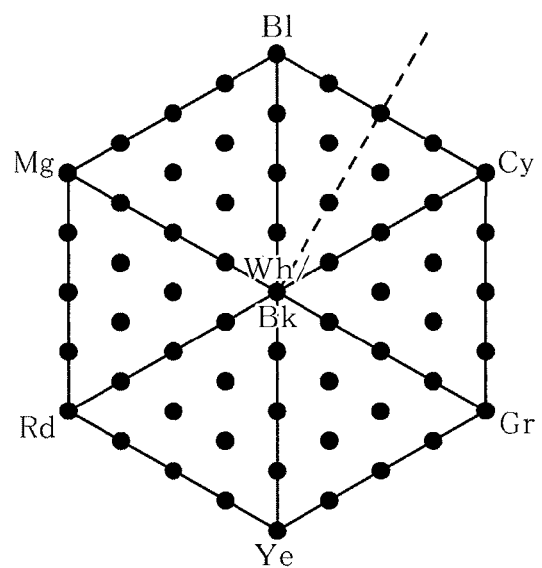
FIG. 29 is a view for explaining the problems associated with the conventional color conversion table.
Figure 30:
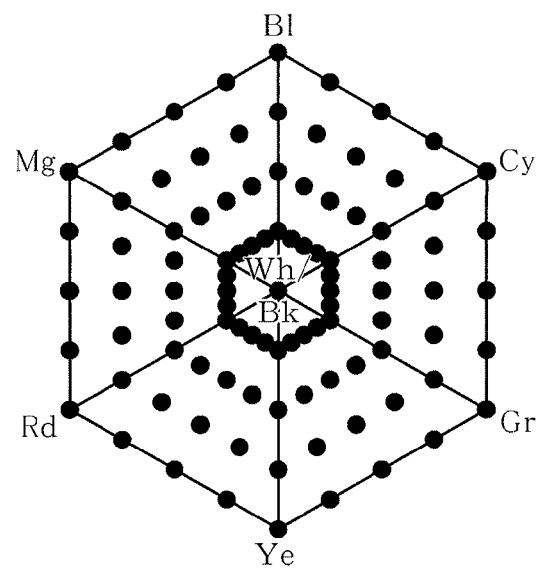
FIG. 30 is a grid point arrangement view when the radial color conversion table is viewed from the achromatic color axis.

FIG. 27 is a view for explaining the method for obtaining the conversion point A based on the mapping points A'n and A'n+1.

As shown in FIG. 27, when viewed from the direction of the achromatic color axis, the conversion point A can be regarded as an intersection at which a line formed of the mapping point A'n on the hue layer Sn and the mapping point A'n+1 on the hue layer Sn+1 intersects the hue surface Sa.

Therefore, based on the following formula (13) using the output color value of the mapping points A'n and A'n+1, the output color value of the conversion point A can be obtained.

$$A=(1-\epsilon I)\cdot A'n+\epsilon I\cdot A'n+1 \quad (13)$$

wherein $\epsilon I=HnA'n\cdot \sin \Delta\phi_n/(HnA'n\cdot \sin \Delta\phi_n+Hn+1A'n+1\cdot \sin \Delta\phi_{n+1})$, Hn is the leg of the altitude taken down from the mapping point A'n to the achromatic color axis, and Hn+1 is the leg of the altitude taken down from the mapping point A'n+1 to the achromatic color axis.

The output color value of the conversion point A can be calculated by the following formula (14).

$$A=(1-\epsilon o)\cdot A'n+\epsilon o\cdot A'n+1 \quad (14)$$

wherein $\epsilon o=\Delta\phi_n/\Delta\phi_n+\Delta\phi_{n+1}$

When it is difficult to consider that $\sin \Delta\phi_n \approx \Delta\phi_n$, $\sin \Delta_{n+1}=\Delta_{n+1}$, that is, when the difference in hue (angle) between two hue layers which sandwich the conversion point A in respect of hue is relatively large, there is time for calculation or accuracy of calculation is wished to be increased or the like, the above formula (13) may be used.

On the other hand, when it is possible to consider $\sin \Delta\phi_n \approx \Delta\phi_n$, $\sin \Delta_{n+1} \approx \Delta\phi_{n+1}$, that is, when the difference in hue (angle) between two hue layers which sandwich the conversion point A in respect of hue is sufficiently small, for example, when an error would be permitted in conversion accuracy, priority is wished to be given to high-speed operation rather than conversion accuracy, or the like, the above formula (14) may be used.

As mentioned above, according to the second interpolation method, the conversion point A can be obtained based on 8 grid points in the case of the cubic interpolation method and 6 grid points in the case of the triangular prism interpolation method.

Therefore, it is easy to specify the region in which the conversion point A is included, and the amount of consumed memory can be reduced in respect of easiness of flow.

Accordingly, as compared with the first interpolation method in which the conversion point A is obtained after calculating a large number of virtual grid point group, a higher color conversion treatment can be realized.

(Color Conversion Program, Image-Forming Program)

Next, an explanation will be made on the color conversion program and the image-forming program.

The color conversion function and output function of a computer (image-forming device) in the above-mentioned embodiment can be realized by the color conversion program which is stored in a non-temporal and substantial computer-readable recording medium or a storing means (a ROM or a hard disk, for example).

Further, the color conversion function and output function of a computer (image-forming device) in the above-mentioned embodiment can be realized by the image-forming program which is stored in a non-temporal and substantial computer-readable recording medium or a storing means (a ROM or a hard disk, for example).

A color conversion program, when read by the control means (CPU (Central Processing Unit) or the like) of a computer, it sends instructions to each part of a computer, and allows the computer to conduct predetermined processing, for example, input of image data, grid point arrangement, color conversion table restructuring, color conversion, storing or the like. The image-forming program performs, in addition to these processing, outputting of image data.

In this way, the color conversion function or the image-forming function can be realized by the cooperation of each constituting means of the color conversion program or the image-forming program as software and a computer as a hardware resource (color conversion device, image-forming device).

The color conversion program for realizing the color conversion function or the image-forming program for realizing the image-forming function including the color conversion function are stored in a ROM or hard disk of a computer, or in a computer-readable medium such as an external storing device and a portable recording medium.

The external storing device means a memory adding device which has a built-in storing medium such as a CD-ROM (Compact disc-Read Only Memory) and is externally connected to a color conversion device or an image-forming device. Examples include a flexible disc, a memory card and an optical magnetic disc.

The program stored in a storing medium is loaded on RAM (Random Access Memory) or the like of a computer, and executed by a CPU (control means). Due to this execution, the function of the color conversion device or the image-forming device in the above-mentioned embodiment is realized.

Further, when loading the color conversion program or the image-forming program by a computer, these programs owned by other computers can be downloaded to your own RAM or external memory device by utilizing a communication line. The thus downloaded program is executed by a CPU, whereby the color conversion function of the color conversion device or the image-forming device in the above-mentioned embodiment is realized.

As mentioned above, according to the color conversion device, the image-forming device, the color-conversion program, the image-forming program and the color conversion table (cubic grid color conversion table) in this embodiment, while maintaining the positional relationship of each grid point in the radial color conversion table, i.e. continuity of the hue, a cubic grid color conversion table conforming to the conventional cubic grid color conversion table is configured, and color conversion is conducted by using this table.

As for the color value according to an unknown coordinate, which does not coincident with the grid point of the color conversion table, it can be converted to a corresponding adequate color value through various interpolation treatments.

Therefore, color conversion or color adjustment which matches the sense of a human being to colors, such as shade or tone, can be conducted appropriately. In addition, a high degree of integrity, compatibility or affinity for the existing device or system can be attained.

That is, it is possible to arrange grid points along the direction in which the sense of a human being is more sensitive without arranging a large number of grid points in a color space. As a result, advantageous effects that processing load becomes small, color conversion speed becomes high, and color conversion is possible by an inexpensive device can be brought about.

Further, the color conversion device, the image-forming device, the color-conversion program, the image-forming program and the color conversion table in this embodiment have good compatibility with a device using an orthogonal grid color conversion table, which is proved in a large number of existing systems, and ASIC programs. Moreover, if it can be diverted to the existing system easily, and hence, part of the existing system can be diverted or the existing system can be renewed to a control system having high hue-retaining properties. As a result, advantageous effects that obsolescence of a product at an early stage is prevented, the product life is prolonged and the value thereof is maintained are brought about.

Hereinabove, the color conversion device, the image-forming device, the color conversion program, the image-forming program and the color conversion table of the present invention are explained with reference to the preferred embodiment. The present invention is, however, not limited to the above mentioned embodiment, and it is needless to say that various modifications are possible within the range of the present invention.

For example, as the interpolation method for obtaining the conversion point A, it is possible to use tetrahedron interpolation which is performed based on the triangular pyramid that is obtained by dividing the triangular prism obtained by dividing the rectangular cube or the cube which includes the conversion point A, or extrapolation using adjacent grid points when the interpolation calculation cannot be possible in a space including the conversion point A.

Industrial Applicability

The present invention can be preferably used in an image-forming device such as a color printer.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in its entirety.

The invention claimed is:

1. A color conversion device comprising a grid point arranging part which arranges, between an input device represented by three values of RGB and an output device represented by four values of CMYK, grid points as correspondence of the RGB value of the input device and the CMYK value of the output device equally in a radial direction from a prescribed achromatic color axis to generate a radial color conversion table;
   a color conversion table restructuring processing part which stacks, in the order of hue, a hue layer consisting of a surface of a hue and a surfaced of its complementary hue of the radial color conversion table to generate an orthogonal grid color conversion table in which the grids form an orthogonal grid;
   an image information input part which inputs image data of RGB format; and
   a color conversion processing part which converts the input image data of RGB format into image data of CMYK format by means of the orthogonal grid color conversion table; wherein,
   the grid point arranging part, in color conversion from the RGB value to the CMYK value, divides the line RdYe, the line YeGr, the line GrCy, the line CyBl, the line BlMg, and the line MgRd of the orthogonal grid having Rd (red), Gr (green), Bl (blue), Cy (cyan), Mg (magenta), Ye (yellow), Wh (white) and Bk (black) as the vertex into N equal parts (N is a positive integer) to generate a predetermined color region chroma edge points, divides the color region chroma edge points into the combination of the chroma saturation point P and the chroma saturation point P' which satisfy the complementary color relationship, generates a radial color conversion table by arranging the above-mentioned grid point at an intersection obtained by dividing the line BkP and the line BkP' of a square part formed of BkPWhP' which is formed for each combination into 3N equal parts, and
   the color conversion reorganization processing part generates an orthogonal grid color conversion table in which the grid forms an orthogonal grid by stacking, in the order of hue, a hue layer consisting of a surface of a hue and a surface of its complementary hue of the radial color conversion table.

2. The color conversion device according to claim 1, wherein the grid point arranging part generates the radial color conversion table by arranging the grid point at an intersection obtained by dividing the line BkP and the line BkP' of the square region formed of BkPWhP' into X equal parts wherein X is the multiple of 8.

3. The color conversion device according to claim 1, wherein the grid point arranging part generates the radial color conversion table by arranging the grid point at an intersection obtained by dividing the line BkP and the line BkP' of the square region formed of BkPWhP' into X equal parts wherein X is the multiple of 6.

4. An image-forming device provided with a predetermined color conversion device and an image information output part which outputs image data of CMYK format which has been color-converted by the color conversion device, wherein the color conversion device is the color conversion device according to claim 1.

5. A non-transitory substantial computer-readable storing medium that stores a program, which allows a computer to function as:
   a grid point arranging part which arranges, between an input device represented by three values of RGB and an output device represented by four values of CMYK, grid points as correspondence of the RGB value of the input device and the CMYK value of the output device equally in a radial direction from a prescribed achromatic color axis to generate a radial color conversion table;
   a color conversion table restructuring processing part which stacks, in the order of hue, a hue layer consisting of a surface of a hue and a surface of its complementary hue of the radial color conversion table to generate an orthogonal grid color conversion table in which the grids form an orthogonal grid;
   an image information input part which inputs image data of RGB format; and
   a color conversion processing part which converts the input image data of RGB format into image data of CMYK format by means of the orthogonal grid color conversion table; and
   allows the grid point arranging part, in color conversion from the RGB value to the CMYK value, to divide the line RdYe, the line YeGr, the line GrCy, the line CyBl, the line BlMg, and the line MgRd of the orthogonal grid having Rd (red), Gr (green), Bl (blue), Cy (cyan), Mg (magenta), Ye (yellow), Wh (white) and Bk (black) as the vertex into N equal parts (N is a positive integer) to generate a predetermined color region chroma edge points, to divide the color region chroma edge point into the combination of the chroma saturation point P and the chroma saturation point P' which satisfy the complementary color relationship, arrange the above-mentioned grid point at an intersection obtained by dividing the line BkP and the line BkP' of a square part formed of BkPWhP' which is formed for each combination into 3N equal parts, thereby to generate the radial color conversion table, and
   allows the color conversion restructuring part to generate an orthogonal grid color conversion table in which the grid points form an orthogonal grid by stacking, in the order of hue, a hue layer consisting of a surface of a hue and a surface of its complementary hue of the radial color conversion table.

6. A non-transitory substantial computer-readable storing medium which stores an image-forming program, wherein it is provided with the function of a predetermined color conversion program and stores an image-forming program which outputs image data of CMYK format which has been color converted, wherein the color conversion program is the color conversion program according to claim 5.

7. A non-transitory substantial computer-readable storing medium that stores a program, which allows a computer functioning as:
   a color conversion table for converting an input image data of RGB format into an image data of CMYK format, wherein, between an input device represented by three values of RGB and an output device represented by four values of CMYK, grid points as correspondence of the RGB value of the input device and the CMYK value of the output device are arranged equally in the radial direction from the predetermined achromatic color axis to form a radial grid point group, and the grid forms an orthogonal grid by stacking, in the order of hue, a hue layer consisting of one hue surface and its complementary hue surface, and wherein
   a predetermined color region chroma edge point obtained by dividing the line RdYe, the line YeGr, the line GrCy, the line CyBl, the line BlMg, and the line MgRd of the orthogonal grid having Rd (red), Gr (green), Bl (blue), Cy (cyan), Mg (magenta), Ye (yellow), Wh (white) and Bk (black) as the vertex into N equal parts (N is a positive integer) is divided into the combination of the chroma saturation point P and the chroma saturation point P' which satisfy the complementary color relationship to form to generate a radial grid point group in which the grid point is arranged at an intersection obtained by dividing the line BkP and the line BkP' of a square part formed of BkPWIT' which is formed for each combination into 3N equal parts, and a surface of a hue and a surface of its complementary hue of the grid point group are stacked in the order of hue, whereby'the grid points form an orthogonal grid.

* * * * *